(12) United States Patent (10) Patent No.: US 8,996,023 B2
Nakasato (45) Date of Patent: Mar. 31, 2015

(54) BASE STATION AND COMMUNICATION METHOD

(75) Inventor: Yuuki Nakasato, Ogaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/119,147

(22) PCT Filed: May 25, 2012

(86) PCT No.: PCT/JP2012/063519
§ 371 (c)(1),
(2), (4) Date: Nov. 20, 2013

(87) PCT Pub. No.: WO2012/165342
PCT Pub. Date: Dec. 6, 2012

(65) Prior Publication Data
US 2014/0113639 A1 Apr. 24, 2014

(30) Foreign Application Priority Data
May 27, 2011 (JP) .................................. 2011-118725

(51) Int. Cl.
*H04W 72/00* (2009.01)
*H04W 72/04* (2009.01)
(Continued)

(52) U.S. Cl.
CPC ............. *H04W 72/04* (2013.01); *H04B 7/0615* (2013.01); *H04W 16/28* (2013.01); *H04W 72/0453* (2013.01)
USPC ..... 455/450; 455/451; 455/452.1; 455/452.2; 455/464; 455/25; 455/63.4; 455/575.7; 370/329; 370/341; 370/334

(58) Field of Classification Search
USPC ............ 455/450, 452.1, 452.2, 464, 25, 63.4, 455/575.7; 370/329, 341, 334
See application file for complete search history.

(56) References Cited

U.S. PATENT DOCUMENTS 8,111,709 B2 * 2/2012 Hunukumbure et al. ..... 370/437
8,537,768 B2 9/2013 Yamada et al.
(Continued)

FOREIGN PATENT DOCUMENTS

JP 2008-99079 A 4/2008
JP 2011-010315 A 1/2011

OTHER PUBLICATIONS

International Search Report dated Jul. 17, 2012, issued for International Application No. PCT/JP2012/063519.
(Continued)

*Primary Examiner* — Khalid Shaheed
(74) *Attorney, Agent, or Firm* — Procopio, Cory, Hargreaves & Savitch LLP

(57) ABSTRACT

For downlink communication with a communication terminal using a downlink radio resource allocated to this communication terminal by a radio resource allocating unit, if this communication terminal does not transmit a first known signal using an associated uplink radio resource associated with this downlink radio resource but it transmits the first known signal using a nonassociated uplink radio resource which is not associated with this downlink radio resource and which includes the frequency band of this downlink radio resource in a frequency direction, a communication unit controls the transmission directivity of a plurality of antennas based on a second known signal if the aforementioned communication terminal transmits the second known signal in the frequency band of the aforementioned downlink radio resource in an interval between a time period of this downlink radio resource and a time period of the aforementioned nonassociated uplink radio resource.

5 Claims, 16 Drawing Sheets

(51) Int. Cl.
*H04W 16/28* (2009.01)
*H04B 7/06* (2006.01)

(56) References Cited

U.S. PATENT DOCUMENTS

| | | | |
|---|---|---|---|
| 8,559,384 B2 | 10/2013 | Yamada et al. | |
| 2001/0028675 A1* | 10/2001 | Bierly et al. | 375/143 |
| 2007/0087694 A1* | 4/2007 | Jin et al. | 455/63.1 |
| 2007/0285312 A1* | 12/2007 | Gao et al. | 342/367 |
| 2008/0267063 A1* | 10/2008 | Trigui et al. | 370/229 |
| 2011/0002411 A1* | 1/2011 | Forenza et al. | 375/267 |
| 2011/0274077 A1 | 11/2011 | Yamada et al. | |

OTHER PUBLICATIONS

Samsung, 3GPP TSG RAN WG1 #60, SRS Enhancements in Rel-10, Feb. 22, 2010, San Francisco, USA.
International Preliminary Report on Patentability dated Dec. 12, 2013, issued for International Application No. PCT/JP2012/063519.

* cited by examiner

F I G . 4

| CONFIGURATION NUMBER | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

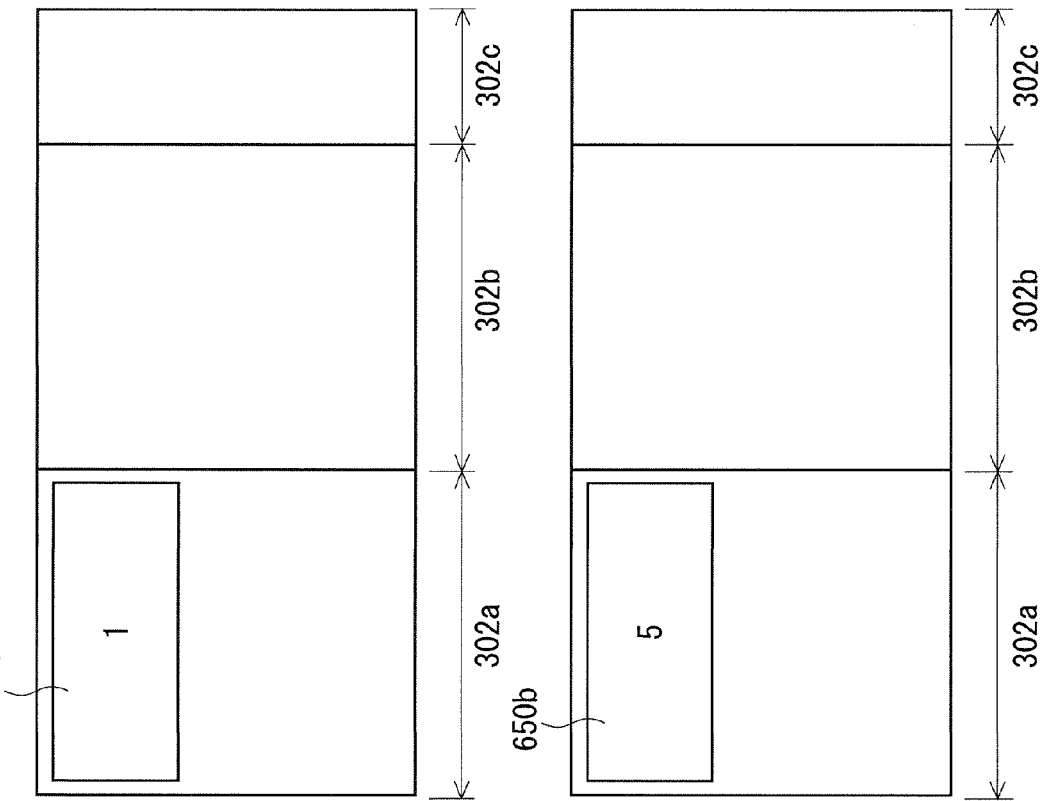
FIG. 12
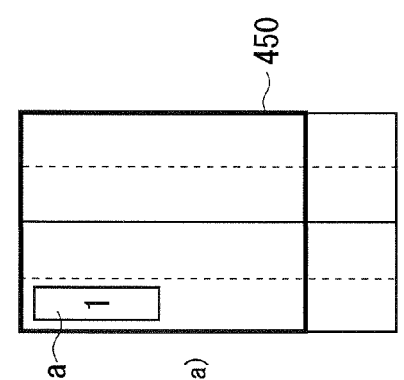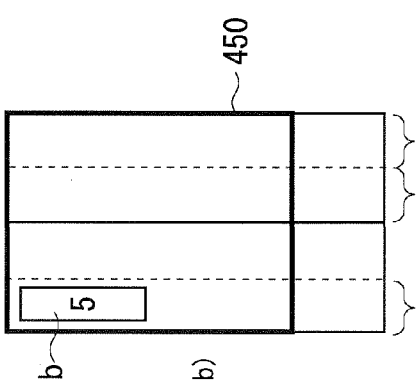

BASE STATION AND COMMUNICATION METHOD

TECHNICAL FIELD

The present invention relates to a base station that makes communication using a plurality of antennas.

BACKGROUND ART

Various techniques relating to radio communication have been suggested conventionally. As an example, patent literature 1 discloses a technique relating to LTE (Long Term Evolution). LTE is also called "E-UTRA."

PRIOR ART LITERATURE

Patent Literature

Patent Literature 1: Japanese Patent Application Laid-Open No. 2008-099079

SUMMARY OF THE INVENTION

Problem to be Solved by the Invention

In some cases, a base station of a communication system such as LTE adopts an adaptive array antenna system that adaptively controls the directivity of a plurality of antennas.

Meanwhile, the base station is required to enhance its transmission performance.

The present invention has been made in view of the aforementioned issues, and is intended to provide a technique capable of enhancing the transmission performance of a base station to make communication by controlling the transmission directivity of a plurality of antennas.

Means to Solve the Problems

A base station according to one aspect is a base station among a plurality of base stations in a communication system. The base station includes a communication unit that makes communication using a plurality of antennas, and for downlink communication, controls the transmission directivity of the antennas based on a known signal transmitted from a communication terminal, and a radio resource allocating unit that allocates a downlink radio resource to a communication terminal to be used for downlink communication between the communication unit and this communication terminal. The known signal includes a first known signal and a second known signal transmitted from a communication terminal using different uplink radio resources. In the communication system, a downlink radio resource and an uplink radio resource to be used for transmission of the first known signal from a communication terminal are associated for beamforming and null steering to be performed based on the first known signal. For downlink communication with a communication terminal using a downlink radio resource allocated to this communication terminal by the radio resource allocating unit, if this communication terminal does not transmit the first known signal using an associated uplink radio resource associated with this downlink radio resource but it transmits the first known signal using a nonassociated uplink radio resource which is not associated with this downlink radio resource and which includes the frequency band of this downlink radio resource in a frequency direction, the communication unit controls the transmission directivity of the antennas based on the second known signal if the aforementioned communication terminal transmits the second known signal in the frequency band of the aforementioned downlink radio resource in an interval between a time period of this downlink radio resource and a time period of the aforementioned nonassociated uplink radio resource.

A communication method according to one aspect is a communication method adopted for communication of a base station among a plurality of base stations in a communication system with a communication terminal. The communication method includes (a) a step of making communication using a plurality of antennas, and for downlink communication, controlling the transmission directivity of the antennas based on a known signal transmitted from a communication terminal, and (b) a step of allocating a downlink radio resource to a communication terminal to be used for the downlink communication with this communication terminal in the step (a). The known signal includes a first known signal and a second known signal transmitted from a communication terminal using different uplink radio resources. In the communication system, a downlink radio resource and an uplink radio resource to be used for transmission of the first known signal from a communication terminal are associated for beamforming and null steering to be performed based on the first known signal. For downlink communication with a communication terminal using a downlink radio resource allocated to this communication terminal in the step (b), if this communication terminal does not transmit the first known signal using an associated uplink radio resource associated with this downlink radio resource but it transmits the first known signal using a nonassociated uplink radio resource which is not associated with this downlink radio resource and which includes the frequency band of this downlink radio resource in a frequency direction, the transmission directivity of the antennas is controlled based on the second known signal in step (a) if the aforementioned communication terminal transmits the second known signal in the frequency band of the aforementioned downlink radio resource in an interval between a time period of this downlink radio resource and a time period of the aforementioned nonassociated uplink radio resource.

Advantageous Effects of the Invention

The present invention is capable of enhancing the transmission performance of a base station.

These and other objects, features, aspects, and advantages of the present invention will become more apparent from the following detailed description and the accompanying drawings.

BRIEF DESCRIPTION OF DRAWINGS

FIG. 4 shows types of the configurations of the TDD frame.

FIG. 12 explains beamforming and null steering performed properly in the base station.

EMBODIMENT(S) FOR CARRYING OUT THE INVENTION

Figure 1:
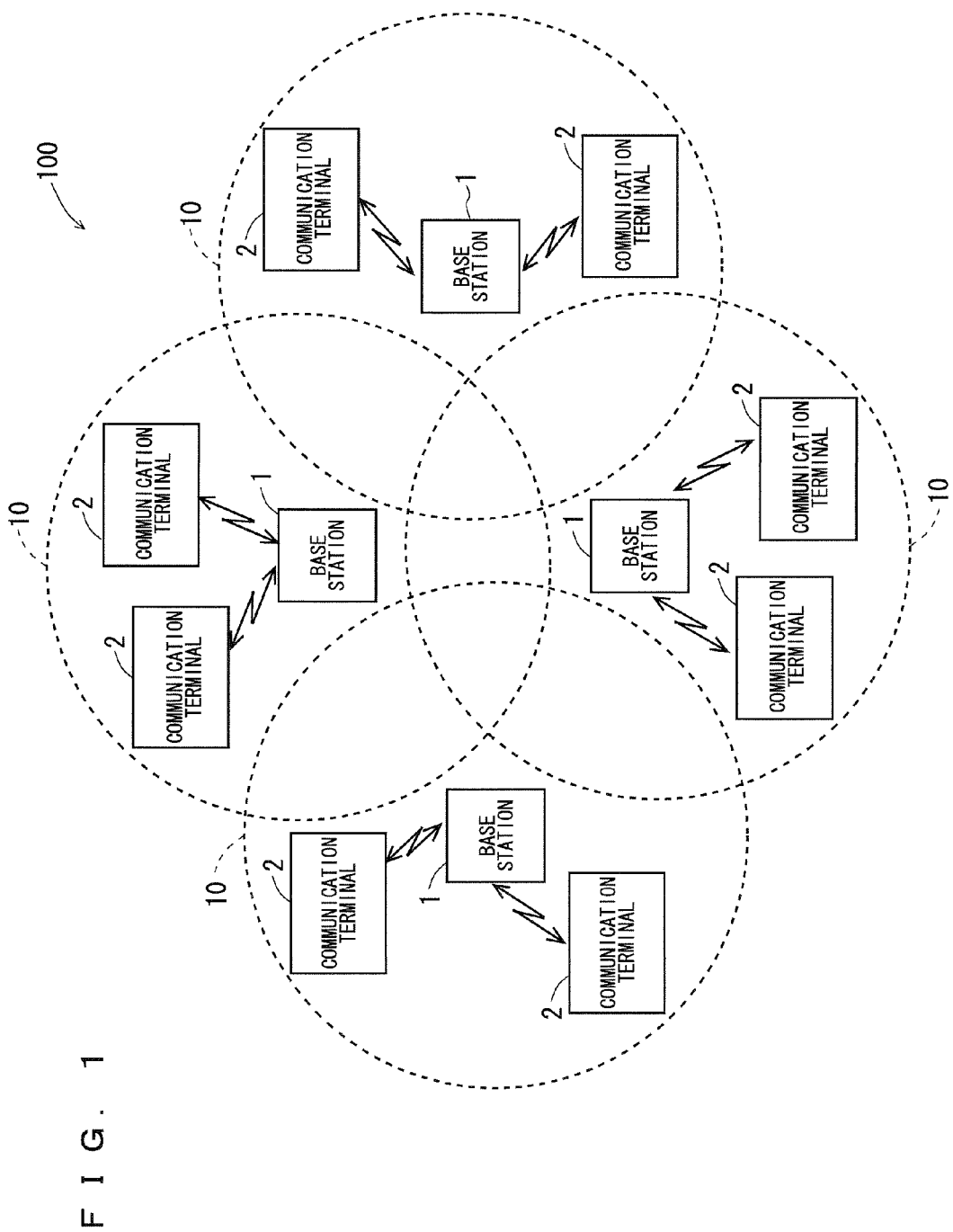
FIG. 1 shows the configuration of a communication system according to an embodiment of the present invention.

FIG. 1 shows the configuration of a communication system 100 according to an embodiment of the present invention. The communication system 100 is LTE that adopts a TDD (time division duplexing) system as a duplex operation system, and includes a plurality of base stations 1. Each base station 1 makes communication with a plurality of communication terminals 2. LTE uses an OFDMA (orthogonal frequency division multiple access) system for downlink communication, and an SC-FDMA (single carrier-frequency division multiple access) system for uplink communication. Thus, the OFDMA system is used for transmission from the base station 1 to the communication terminal 2, whereas the SC-FDMA system is used for transmission from the communication terminal 2 to the base station 1. An OFDM (orthogonal frequency division multiplexing) signal synthesized from a plurality of subcarriers orthogonal to each other is used for communication between the base station 1 and the communication terminal 2.

As shown in FIG. 1, a service area 10 of each base station 1 of the embodiment of the present invention partially overlaps a service area 10 of a peripheral base station 1. Only four base stations 1 are shown in FIG. 1, so that one base station 1 corresponds to only two or three peripheral base stations 1. However, in a practical sense, one base station 1 may correspond for example to six peripheral base stations 1.

The base stations 1 are connected to a network not shown in the drawings, and can communication with each other via this network. A server not shown in the drawings is connected to the network. Each base station 1 can communicate with the server via the network.

Figure 2:
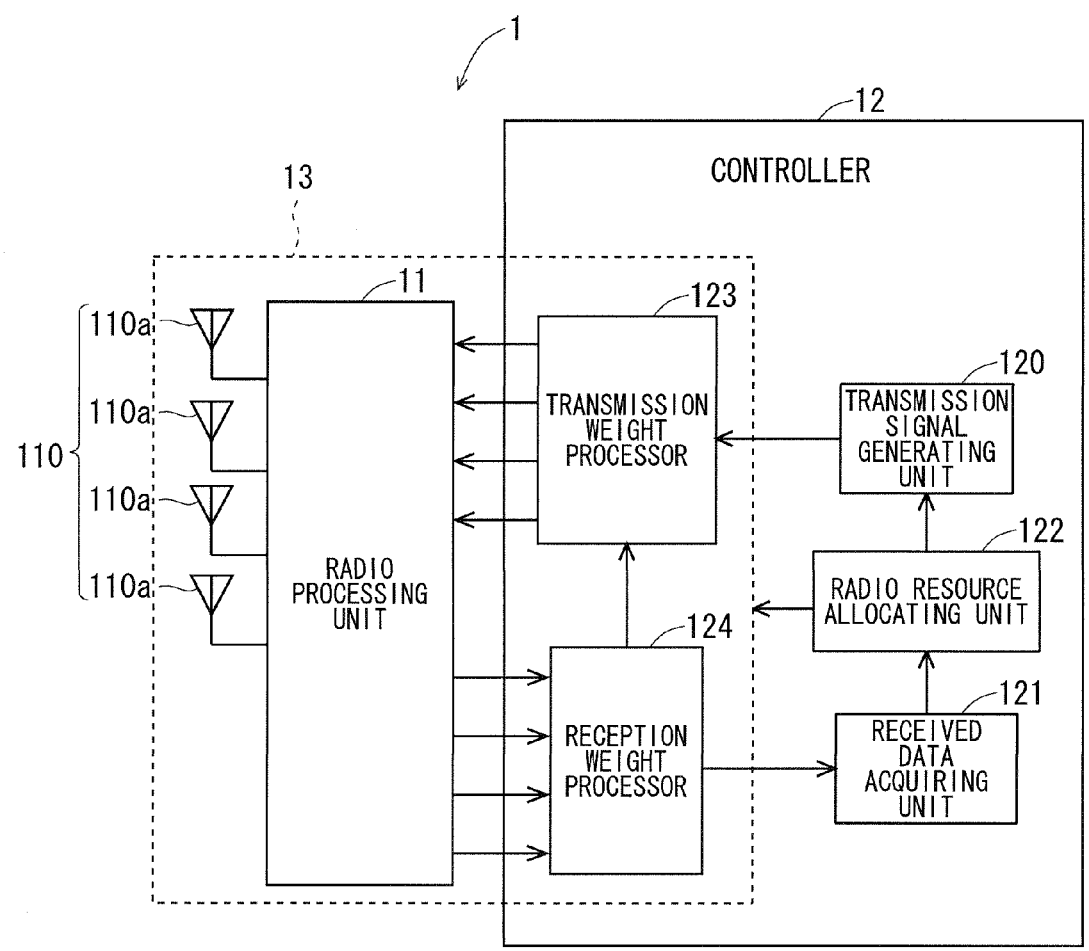
FIG. 2 shows the configuration of a base station according to the embodiment of the present invention.

FIG. 2 shows the configuration of each base station 1. The base station 1 allocates to each of the communication terminals 2 a radio resource specified in two dimensions by a time axis and a frequency axis, thereby allowing the base station 1 to make communication with these communication terminals 2 simultaneously. The base station 1 includes an array antenna as a transmitting and receiving antenna, and can control the directivity of the array antenna by adopting an adaptive array antenna system.

As shown in FIG. 2, the base station 1 includes a radio processing unit 11 and a controller 12 that controls the radio processing unit 11. The radio processing unit 11 includes an array antenna 110 composed of a plurality of antennas 110a. The radio processing unit 11 performs amplification process, down-conversion, A/D conversion process and the like on each of a plurality of received signals received by the array antenna 110 to generate a plurality of baseband received signals, and outputs these received signals.

Further, the radio processing unit 11 performs D/A conversion process, up-conversion, amplification process and the like on each of a plurality of baseband transmission signals generated by the controller 12 to generate a plurality of transmission signals in a carrier frequency band. Then, the radio processing unit 11 inputs the resultant transmission signals in the carrier frequency band to each of the antennas 110a forming the array antenna 110. As a result, a transmission signal is transmitted without wires from each antenna 110a.

The controller 12 is composed of a CPU (central processing unit), a DSP (digital signal processor), a memory, and the like. In the controller 12, the CPU and the DSP execute a program in the memory, thereby forming a plurality of functional blocks including a transmission signal generating unit 120, a received data acquiring unit 121, a radio resource allocating unit 122, a transmission weight processor 123, and a reception weight processor 124.

The transmission signal generating unit 120 generates transmission data to be transmitted to the communication terminal 2 as a communication counterpart. The transmission data contains control data and user data. Further, the transmission signal generating unit 120 generates a baseband transmission signal containing the resultant transmission data. The number of such transmission signals to be generated corresponds to the number of the antennas 110a forming the array antenna 110.

The transmission weight processor 123 determines a plurality of transmission weights for corresponding ones of the transmission signals generated by the transmission signal generating unit 120. These transmission weights are intended to control the transmission directivity of the array antenna 110. Further, the transmission weight processor 123 performs IDFT (inverse discrete Fourier transform) and the like on the transmission signals for which the respective transmission weights are determined, and then outputs the resultant transmission signals to the radio processing unit 11.

The reception weight processor 124 performs DFT (discrete Fourier transform) on a plurality of received signals input from the radio processing unit 11, and then determines a plurality of reception weights for corresponding ones of these received signals. These reception weights are intended to control the receiving directivity of the array antenna 110. Further, the reception weight processor 124 combines the received signals for which the respective reception weights are determined to synthesize a new received signal (hereinafter called a "synthesized received signal").

The received data acquiring unit 121 performs inverse discrete Fourier transform, demodulation process and the like on the synthesized received signal generated by the reception weight processor 124 to acquire control data and use data in this synthesized received signal.

In the base station 1 of this embodiment, the radio processing unit 11, the transmission weight processor 123, and the reception weight processor 124 form a communication unit 13 that makes communication with the communication terminals 2 while adaptively controlling the directivity of the array antenna 110. The communication unit 13 controls each of the receiving directivity and the transmission directivity of the array antenna 110 while making communication with the communication terminal 2. More specifically, the communication unit 13 makes the reception weight processor 124 control a reception weight by which a received signal is to be multiplied, thereby allowing a beam and a null of the receiving directivity of the array antenna 110 to be set in various directions. Further, the communication unit 13 makes the transmission weight processor 123 control a transmission weight by which a transmission signal is to be multiplied, thereby allowing a beam and a null of the transmission directivity of the array antenna 110 to be set in various directions. The transmission weight can be obtained from the reception weight, and the reception weight can be obtained based on a known signal from the communication terminal 2.

The radio resource allocating unit 122 determines the communication terminal 2 with which downlink communication of data is to be made and allocates to this communication terminal 2 a downlink radio resource to be used for the downlink communication of the data with this communication terminal 2 (hereinafter called an "use downlink radio resource"). Based on the use downlink radio resource allocated to the communication terminal 2 by the radio resource allocating unit 122, the transmission signal generating unit 120 generates a transmission signal containing data to be transmitted to this communication terminal 2 and inputs this transmission signal to the transmission weight processor 123 in compliance with timing determined based on this use downlink radio resource. As a result, the transmission signal containing the data to be transmitted to the communication terminal 2 is transmitted from the communication unit 13 using the use downlink radio resource allocated to this communication terminal 2. The transmission signal generating unit 120 generates a transmission signal containing control data to be used to notify the communication terminal 2 of the use downlink radio resource allocated to this communication terminal 2 by the radio resource allocating unit 122, and outputs the resultant transmission signal. This allows the communication terminal 2 to know the use downlink radio resource to be used for transmission of data directed to the communication terminal 2 itself and to receive the data properly from the base station 1 directed to the communication terminal 2 itself.

The radio resource allocating unit 122 determines the communication terminal 2 to make uplink communication of data and allocates to this communication terminal 2 an uplink radio resource to be used for the uplink communication of the data with this communication terminal 2 (hereinafter called a "use uplink radio resource"). The transmission signal generating unit 120 generates a transmission signal containing control data to be used to notify the communication terminal 2 of the use uplink radio resource allocated to this communication terminal 2 by the radio resource allocating unit 122, and outputs the resultant transmission signal. This allows the communication terminal 2 to know the use uplink radio resource to be used for transmission of data to the base station 1. Then, the communication terminal 2 transmits the data without wires to the base station 1 using this use uplink radio resource.

Further, the radio resource allocating unit 122 allocates to the communication terminal 2 an uplink radio resource to be used when this communication terminal 2 transmits a sounding reference signal (SRS) as a known signal described later (hereinafter called a "use uplink radio resource for SRS"). The transmission signal generating unit 120 generates a transmission signal containing control data to be used to notify the communication terminal 2 of the use uplink radio resource for SRS allocated to this communication terminal 2 by the radio resource allocating unit 122, and outputs the resultant transmission signal. This allows the communication terminal 2 to know the use uplink radio resource for SRS to be used for transmission of an SRS to the base station 1. Then, the communication terminal 2 transmits the SRS without wires to the base station 1 using this use uplink radio resource for SRS.

<Configuration of TDD Frame>

A TDD frame 300 used between the base station 1 and the communication terminal 2 is described next. The TDD frame 300 is specified in two dimensions by a time axis and a frequency axis. The TDD frame 300 has a frequency bandwidth (system bandwidth) of 10 MHz, for example. The TDD frame 300 has a time length of 10 ms. The base station 1 determines a use uplink radio resource, a use downlink radio resource, and a use uplink radio resource for SRS to be allocated from the TDD frame 300 to each communication terminal 2.

Figure 3:
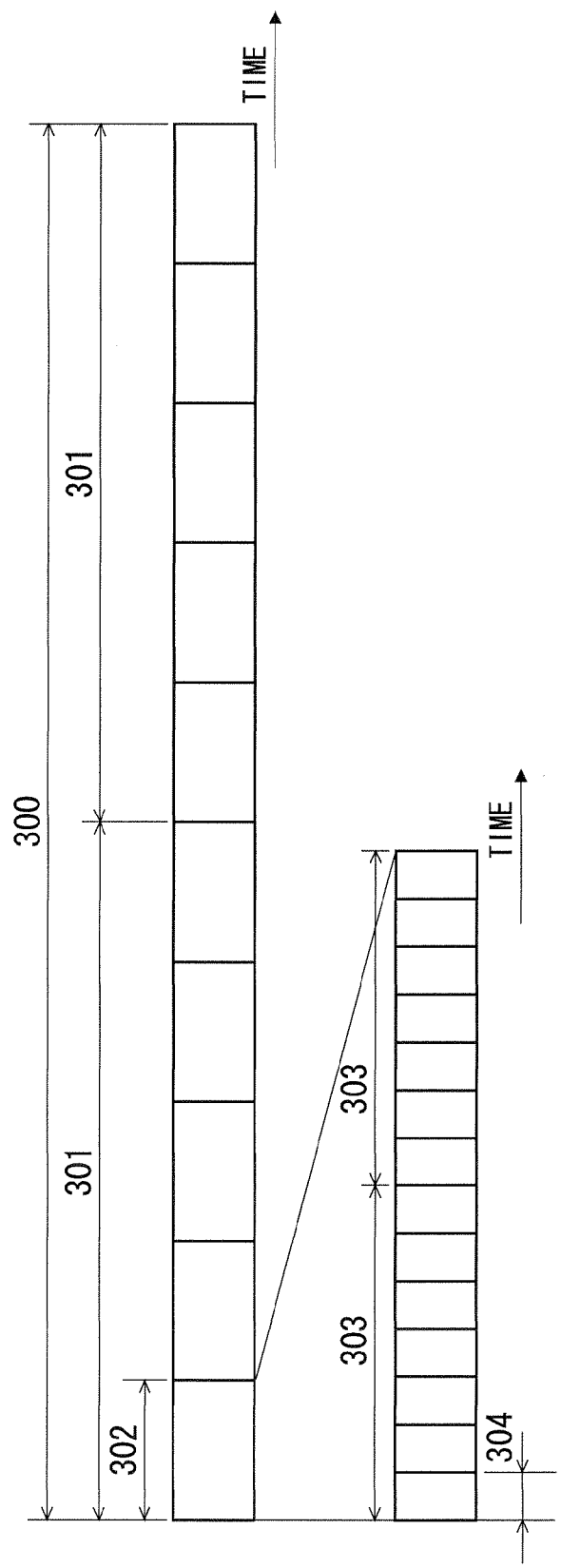
FIG. 3 shows the configuration of a TDD frame.

FIG. 3 shows the configuration of the TDD frame 300. As shown in FIG. 3, the TDD frame 300 is composed of two half-frames 301. Each half frame 301 is composed of five subframes 302. Specifically, the TDD frame 300 is composed of ten subframes 302. The subframe 302 has a time length of 1 ms. In the below, the ten subframes 302 forming the TDD frame 300 may be called zeroth to ninth subframes 302 in this order from the beginning of the TDD frame 300.

Each subframe 302 is composed of two slots 303 arranged in a temporal direction. Each slot 303 is composed of seven symbol periods 304. Thus, 14 symbol periods 304 arranged in the temporal direction are contained in both the subframes 302. The symbol period 304 becomes one symbol period of an OFDM symbol for downlink communication of the OFDMA system and becomes one symbol period of a DFTS (discrete Fourier transform spread)-OFDM symbol for uplink communication of the SC-FDMA system.

The TDD frame 300 of the aforementioned configuration includes a subframe 302 dedicated to uplink communication and a subframe 302 dedicated to downlink communication. In the below, the subframe 302 dedicated to uplink communication will be called an "uplink subframe 302," and the subframe 302 dedicated to downlink communication will be called a "downlink subframe 302." The communication terminal 2 transmits data to the base station 1 in the uplink subframe 302, whereas the base station 1 transmits data to the communication terminal 2 in the downlink subframe 302.

According to LTE, the TDD frame 300 has a frequency bandwidth of 180 kHz in a frequency direction, and a domain (radio resource) including seven symbol periods 304 (one slot 303) in the temporal direction is called a "resource block (RB)." The resource block includes 12 subcarriers. Regarding allocation of a use downlink radio resource or allocation of a use uplink radio resource to the communication terminal 2, the radio resource allocating unit 122 allocates to this communication terminal 2 a use uplink radio resource or a use downlink radio resource in units of two consecutive resource blocks, specifically in units of one subframe 302 in the temporal direction, and in units of one resource block in the frequency direction. The SC-FDMA system is used for uplink communication. Hence, for allocation of a plurality of resource blocks arranged in the frequency direction to some communication terminal 2, a plurality of resource blocks arranged consecutively in the frequency direction is allocated to this communication terminal 2. In the below, for the convenience of description, "RB" means only the frequency bandwidth of a resource block and does not cover the original meaning of a resource block specified in the frequency and temporal directions.

According to LTE, seven types of configurations having different combinations of the uplink subframe 302 and the downlink subframe 302 are assumed as the configurations of the TDD frame 300. FIG. 4 shows these seven types of configurations.

As shown in FIG. 4, LTE defines $0^{th}$ to $6^{th}$ configurations for the TDD frame 300. The communication system 100 uses one of these seven configurations. In FIG. 4, the subframe 302 indicated by "D" means the downlink subframe 302, and the subframe 302 indicated by "U" means the uplink subframe 302. Further, the subframe 302 indicated by "S" means the subframe 302 where downlink communication is switched to uplink communication in the communication system 100. This subframe 302 is called a "special subframe 302."

As an example, in the TDD frame 300 having the zeroth configuration, the zeroth and fifth subframes 302 are the downlink subframes 302, the second to fourth subframes 302 and the seventh to ninth frames 302 are the uplink subframes 302, and the first and sixth subframes 302 are the special subframes 302. Further, in the TDD frame 300 having the fourth configuration, the zeroth subframe 302 and the fourth to ninth subframes 302 are the downlink subframes 302, the second and third subframes 302 are the uplink subframes 302, and the first subframe 302 is the special subframe 302. The communication system 100 of this embodiment uses the TDD frame 300 having the first configuration, for example.

Figure 5:
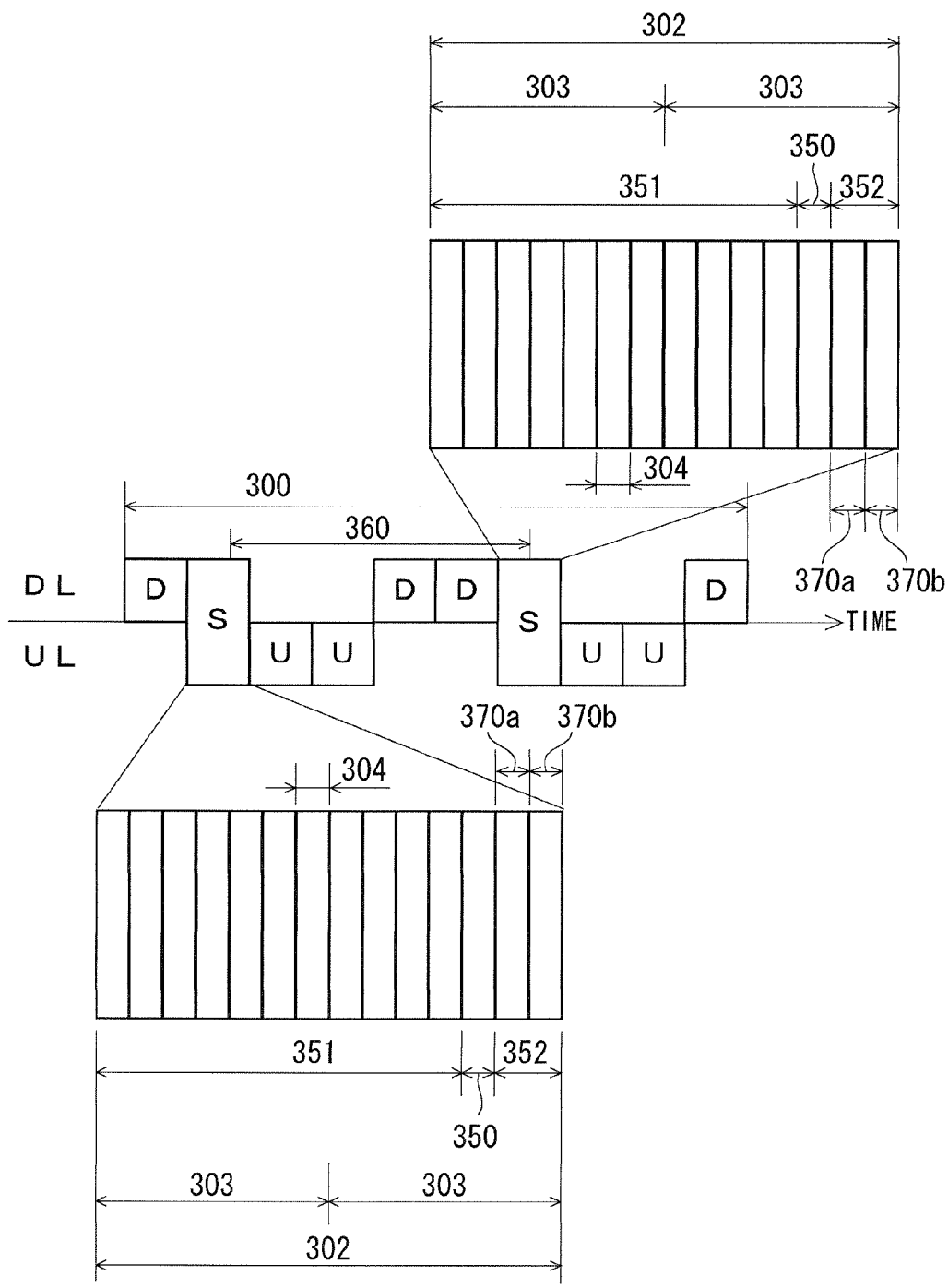
FIG. 5 shows in detail the configuration of the TDD frame.

FIG. 5 shows in detail the configuration of the TDD frame 300 having the first configuration. As shown in FIG. 5, the special subframe 302 includes a downlink pilot time slot (DwPTS) 351, guard time (GP) 350, and an uplink pilot time slot (UpPTS) 352 arranged in the temporal direction. The guard time 350 is a no-signal period required to switch downlink communication to uplink communication, and is not used for communication.

LTE defines various types of combinations of the time lengths of the downlink pilot time slot 351, the guard time 350, and the uplink pilot time slot 352. In the example of FIG. 5, the time length of the downlink pilot time slot 351 is determined to be 11 symbol periods 304, and the time length of the uplink pilot time slot 352 is determined to be two symbol periods 304.

The communication system 100 of this embodiment is capable of making communication not only in the downlink subframe 302 but also in the downlink pilot time slot 351 of the special subframe 302. The communication system 100 is also capable of making communication not only in the uplink subframe 302 but also in the uplink pilot time slot 352 of the special subframe 302.

In this embodiment, the base station 1 transmits data to the communication terminal 2 in each symbol period 304 of the downlink pilot time slot 351. Each communication terminal 2 transmits a known signal called an SRS in one or both of the two symbol periods 304 of the uplink pilot time slot 352. The SRS is composed of a plurality of complex symbols to modulate a plurality of subcarriers. In this embodiment, an SRS transmitted in the uplink pilot time slot 352 is used to calculate a transmission weight. Specifically, the communication unit 13 of the base station 1 can control the transmission directivity of the array antenna 110 based on the SRS transmitted in the uplink pilot time slot 352 from the communication terminal 2. In the below, control of the transmission directivity of the array antenna 110 will be called "array transmission control."

An SRS can also be transmitted in the last symbol period 304 of the uplink subframe 302. Specifically, the communication terminal 2 can transmit data in each symbol period 304 of the uplink subframe 302 except the last symbol period 304 of this uplink subframe 302, and can transmit an SRS in the last symbol period 304. An SRS to be transmitted in the last symbol period 304 of the uplink subframe 302 can be used for the array transmission control. Meanwhile, in this embodiment, an SRS to be transmitted in the uplink pilot time slot 352 is used for the array transmission control. In the below, unless otherwise specified, an SRS means an SRS to be transmitted using the uplink pilot time slot 352. A former symbol period 304 and a latter symbol period 340 of the uplink pilot time slot 352 when the communication terminal 2 can transmit an SRS are called a "first uplink communication period 370a for SRS" and a "second uplink communication period 370b for SRS" respectively. Where there is no particular reason to distinguish between the first and second uplink communication periods 370a and 370b for SRS, the first and second uplink communication periods 370a and 370b for SRS are each called an "uplink communication period for SRS."

A period from the beginning of the first uplink communication period 370a for SRS of the special subframe 302 to the beginning of the first uplink communication period 370a for SRS of the next special subframe 302 is called a "unit period 360." A radio resource such as a use downlink radio resource is allocated to the communication terminal 2 based on the unit period 360. The unit period 360 appears repeatedly in the communication system 100.

In this embodiment, each communication terminal 2 making communication with the base station 1 is given a use uplink radio resource for SRS allocated by the radio resource allocating unit 122, thereby transmitting an SRS at least once in each unit period 360. Specifically, in each unit period 360, each communication terminal 2 making communication with the base station 1 transmits an SRS in one or both of the first and second uplink communication periods 370a and 370b for SRS of this unit period 360. The unit period 360 is 5 ms in length, so that each communication terminal 2 transmits an SRS once or twice within 5 ms.

<Frequency Hopping of SRS Transmission Enabling Band>

Figure 6:
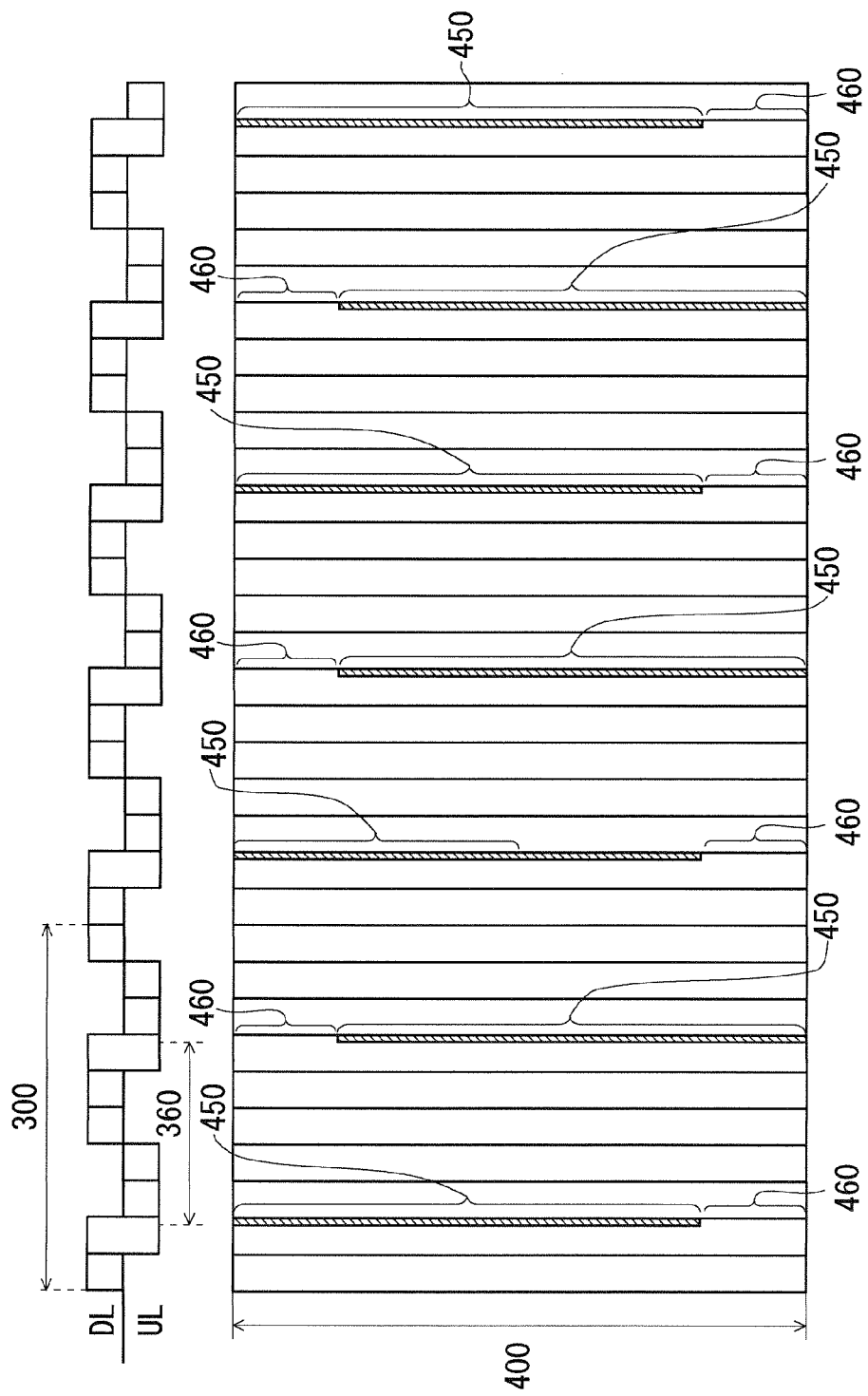
FIG. 6 shows frequency hopping of an SRS transmission enabling band.

In the communication system 100, a frequency band 450 that can be used for transmission of an SRS by the communication terminal 2 (hereinafter called an "SRS transmission enabling band 450") is subjected to frequency hopping in units of one unit period 360. FIG. 6 shows frequency hopping of the SRS transmission enabling band 450.

As shown in FIG. 6, the SRS transmission enabling band 450 in each unit period 360 is arranged on a high-frequency side and a low-frequency side of the system band 400 alternately in units of one unit period 360. Thus, in each unit period 360, an end portion on the high-frequency side or an end portion on the low-frequency side of the system band 400 becomes a band that cannot be used for transmission of an SRS. In the below, this band will be called an "SRS transmission disabling band 460." Each base station 1 cannot allocate, as a use uplink resource for SRS, to the communication terminal 2 an uplink radio resource including a frequency band, in the frequency direction, which is included in the SRS transmission disabling band 460.

The SRS transmission disabling band 460 is common among all the base stations 1. This makes the SRS transmission disabling band 460 that cannot be allocated for SRS transmission to the communication terminal 2 by some base station 1 in each unit period 360 agree with the SRS transmission disabling band 460 that cannot be allocated for SRS transmission to the communication terminal 2 by a peripheral base station 1 existing in a peripheral area of the former base station 1.

If the system bandwidth is 10 MHz as in this embodiment, the system band 400 includes 50 RBs. In this case, the SRS transmission enabling band 450 has a bandwidth corresponding to the frequency bandwidth of 40 RBs, and the SRS transmission disabling band 460 has a bandwidth corresponding to the frequency bandwidth of 10 RBs. In the below, the 50 RBs arranged in the frequency direction are assigned numbers from zero to 49 sequentially in the order of increasing frequencies, and in some cases, the operation of the communication system 100 will be described using these numbers. The frequency bandwidth of x RBs is called an "xRB."

<Structure of SRS>

The communication system 100 of this embodiment defines two types of SRSs identified by a parameter $k_{TC}$ called "transmissionComb." Each communication terminal 2 transmits one of these two types of SRSs in at least one of the first and second uplink communication periods 370a and 370b for SRS.

The parameter $k_{TC}$ can assume a value "0" or "1." A plurality of subcarriers SC0 used for transmission of an SRS specified by the parameter $k_{TC}=0$ (hereinafter called "SRS0") is arranged not consecutively but in a comb-like pattern in the frequency direction. In other words, the carrier frequency of the SRS0 is arranged in a comb-like pattern in the frequency direction. Likewise, a plurality of subcarriers SC1 used for transmission of an SRS specified by the parameter $k_{TC}=1$ (hereinafter called "SRS1") is arranged in a comb-like pattern in the frequency direction. If the SRS0 and the SRS1 are to be transmitted in the same frequency band, the subcarriers SC0 used for transmission of this SRS0 and the subcarriers SC1 used for transmission of this SRS1 are arranged alternately in the frequency direction. Thus, the carrier frequency of the SRS0 and that of the SRS1 do not overlap each other in the frequency direction.

Figure 7:
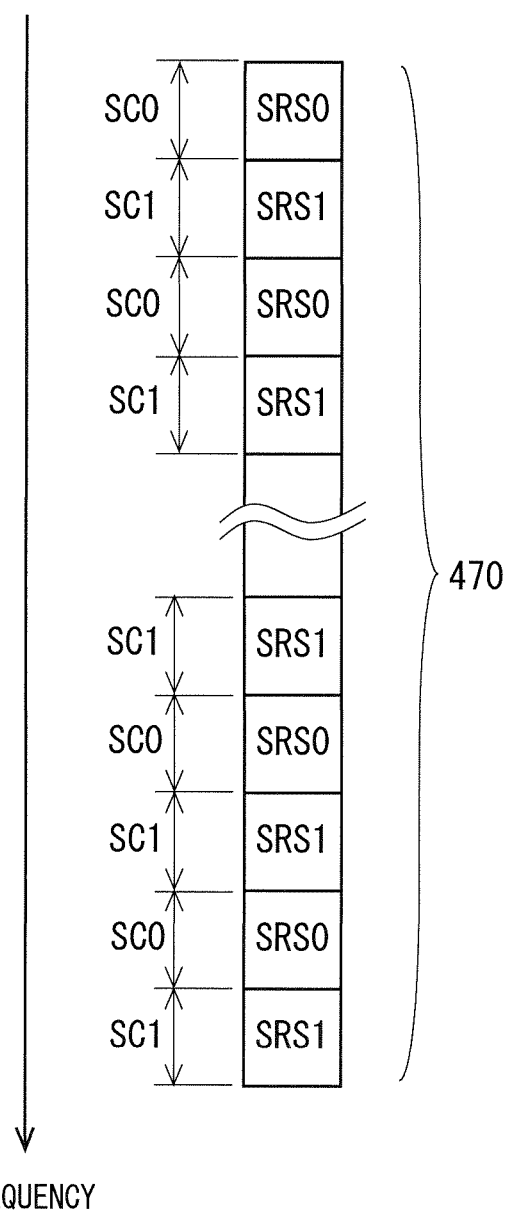
FIG. 7 shows an SRS0 and an SRS1.

FIG. 7 shows how both the SRS0 and the SRS1 are transmitted in a frequency band 470. As shown in FIG. 7, the subcarriers SC0 used for transmission of the SRS0 are arranged at intervals of one subcarrier in the frequency direction. Likewise, the subcarriers SC1 used for transmission of SRS1 are arranged at intervals of one subcarrier in the frequency direction. Further, the subcarriers SC0 and the subcarriers SC1 existing in the same frequency band 470 are arranged alternately in the frequency direction.

As described above, a plurality of subcarriers used for transmission of an SRS by one communication terminal 2 is arranged in a comb-like pattern in the frequency direction. Thus, half of subcarriers existing in a frequency band used for transmission of an SRS by this communication terminal 2 are used for transmission of this SRS. Further, the subcarriers SC0 and the subcarriers SC1 existing in the same frequency band are arranged alternately, so that the communication terminal 2 to transmit the SRS0 and the communication terminal 2 to transmit the SRS1 can share the same frequency band in the same uplink communication period for SRS. From the viewpoint of the base station 1, the base station 1 can distinguish between the SRS0 and the SRS1 transmitted in the same frequency band in the same uplink communication period for SRS.

LTE standards allow each communication terminal 2 to transmit the SRS1 in the first uplink communication period 370a for SRS. However, in this embodiment, each communication terminal 2 is not allowed to transmit the SRS1 in the first uplink communication period 370a for SRS.

In the below, an uplink radio resource specified by the first uplink communication period 370a for SRS and the subcarriers SC0 in a comb-like pattern existing in the SRS transmission enabling band 450 and usable for transmission of the SRS0 will be called a "first uplink radio resource 500a for SRS." An uplink radio resource specified by the second uplink communication period 370b for SRS and the subcarriers SC0 in a comb-like pattern existing in the SRS transmission enabling band 450 and usable for transmission of the SRS0 will be called a "second uplink radio resource 500b for SRS." Further, an uplink radio resource specified by the second uplink communication period 370b for SRS and the subcarriers SC1 in a comb-like pattern existing in the SRS transmission enabling band 450 and usable for transmission of the SRS1 will be called a "third uplink radio resource 500c for SRS."

Figure 8:
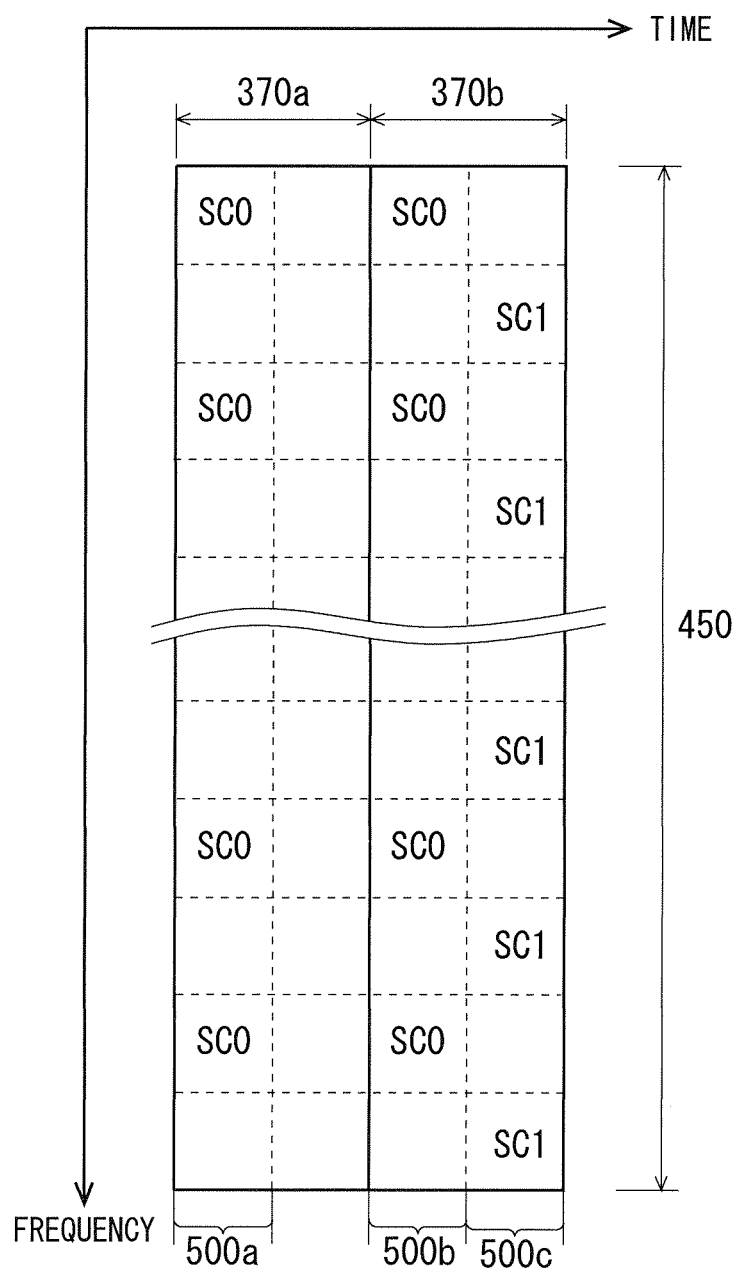
FIG. 8 shows a plurality of uplink radio resources for SRS.

FIG. 8 shows the first, second, and third uplink radio resources 500a, 500b, and 500c for SRS. As shown in FIG. 8, the first, second, and third uplink radio resources 500a, 500b, and 500c existing in the same unit period 360 differ from each other at least in one of the temporal and frequency directions. In the below, where there is no reason to distinguish between these uplink radio resources, these uplink radio resources each will be called an "uplink radio resource for SRS."

LTE defines eight types of code patterns composed of a plurality of SRS symbols forming an SRS. These eight types of code patterns adopt respective eight types of code sequences orthogonal to each other. The communication terminal 2 transmits one of these eight types of code patterns as an SRS.

As described, eight types of code patterns adopting respective eight types of code sequences are defined for an SRS. Thus, according to LTE standards, SRSs transmitted from up to eight communication terminals 2 can be multiplexed. Meanwhile, SRSs are not multiplexed in this embodiment.

<Frequency Hopping of Transmission Frequency Band for SRS>

In the communication system 100 of this embodiment, a transmission frequency band for SRS can be subjected to frequency hopping within the SRS transmission enabling band 450. Additionally, in the communication system 100, a transmission frequency bandwidth for SRS can be changed. In the communication system 100, three types of bandwidths including 40 RBs, 20 RBs, and 4 RBs are defined for example as a bandwidth that can be defined as a transmission frequency bandwidth for SRS.

Figure 9:
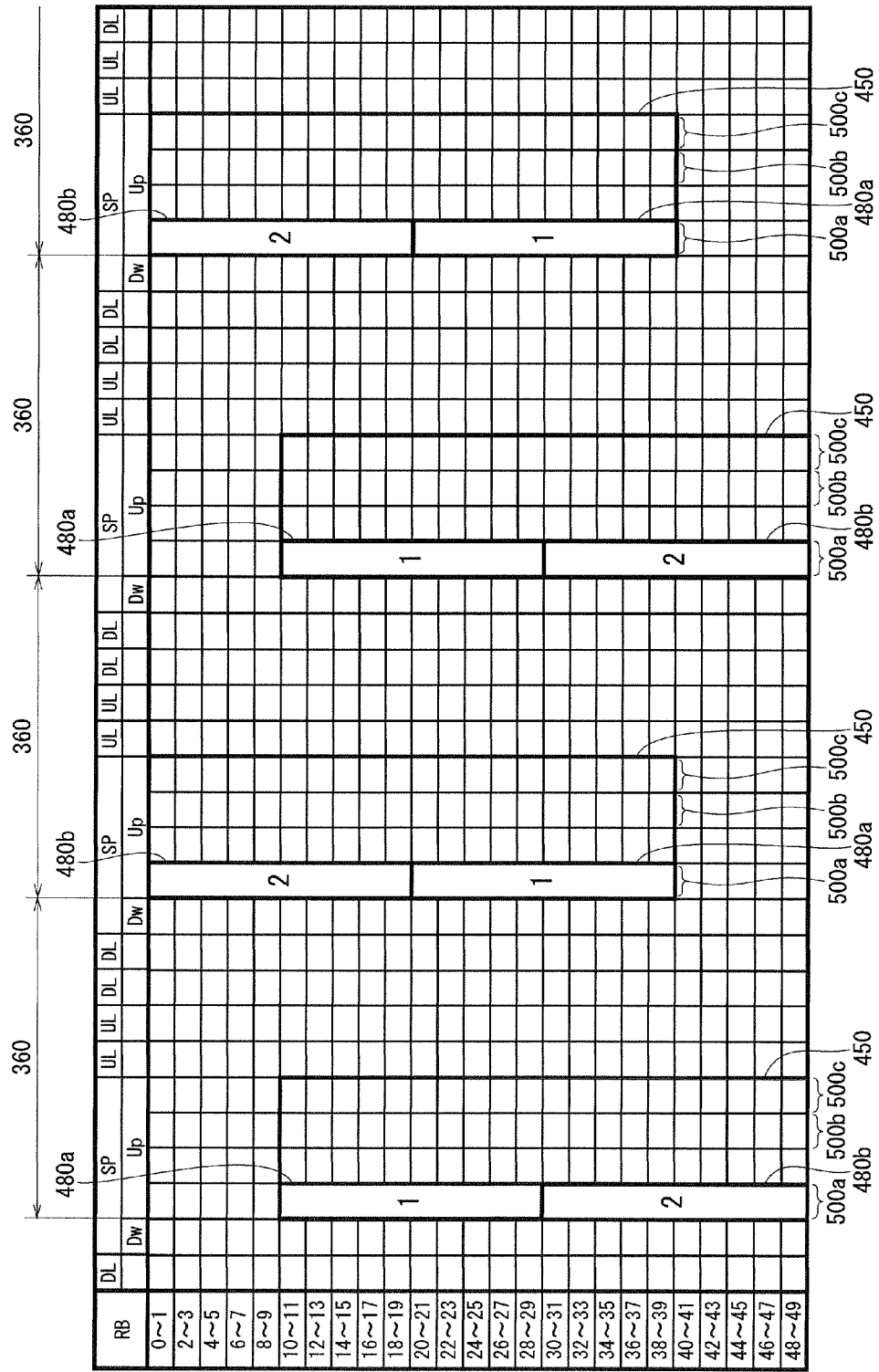
FIG. 9 shows frequency hopping of a transmission frequency band for SRS.

FIG. 9 shows an example where a transmission frequency bandwidth 480a for an SRS transmitted from the communication terminal 2 with a terminal number 1 is subjected to frequency hopping within the SRS transmission enabling band 450 and a transmission frequency bandwidth 480b for an SRS transmitted from the communication terminal 2 with a terminal number 2 is subjected to frequency hopping within the SRS transmission enabling band 450. FIG. 9 shows the subframes 302 in each of a plurality of consecutive unit periods 360. In FIG. 9, a lateral direction indicates the temporal direction and a vertical direction indicates the frequency direction. Numbers 0 to 49 shown in the leftmost part of FIG. 9 indicate the corresponding numbers of 50 RBs arranged in the frequency direction. In FIG. 9, "SP" means the special subframe 302, "Up" means the uplink pilot time slot (UpPTS) 352, and "Dw" means the downlink pilot time slot (DwPTS) 351. Additionally, in FIG. 9, "UL" and "DL" mean the uplink and downlink subframes 302 respectively.

In the example of FIG. 9, the communication terminals 2 with the terminal numbers 1 and 2 each transmit an SRS once in each unit period 360. A transmission frequency bandwidth for an SRS transmitted from each of the communication terminals 2 with the terminal numbers 1 and 2 is determined to be 20 RBs. In the example of FIG. 9, the transmission frequency bandwidth 480a for an SRS transmitted from the communication terminal 2 with the terminal number 1 and the transmission frequency bandwidth 480b for an SRS transmitted from the communication terminal 2 with the terminal number 2 are arranged alternately on a high-frequency side and a low-frequency side within the SRS transmission enabling band 450 in each unit of one unit period 360.

More specifically, in the unit period 360 where the SRS transmission enabling band 450 is arranged on a high-frequency side, the transmission frequency bandwidth 480a is arranged on a low-frequency side within the SRS transmission enabling band 450. In the unit period 360 where the SRS transmission enabling band 450 is arranged on a low-frequency side, the transmission frequency bandwidth 480a is arranged on a high-frequency side within the SRS transmission enabling band 450. As a result, the transmission frequency bandwidth 480a is subjected to frequency hopping within a frequency band corresponding to 30 RBs (from $10^{th}$ to $39^{th}$ RBs) existing in a central portion of the system band. Thus, the communication terminal 2 with the terminal number 1 does not transmit an SRS in 10 RBs existing in an end portion on a low-frequency side of the system band and in 10 RBs existing in an end portion on a high-frequency side of the system band. This frequency hopping is called "middle hopping."

In contrast, in the unit period 360 where the SRS transmission enabling band 450 is arranged on a high-frequency side, the transmission frequency bandwidth 480b is arranged on a high-frequency side within the SRS transmission enabling band 450. In the unit period 360 where the SRS transmission enabling band 450 is arranged on a low-frequency side, the transmission frequency bandwidth 480b is arranged on a low-frequency side within the SRS transmission enabling band 450. As a result, the transmission frequency bandwidth 480b is arranged on a low-frequency side and a high-frequency side alternately of the system band. Thus, the communication terminal 2 with the terminal number 2 does not transmit an SRS in 10 RBs (from $20^{th}$ to $29^{th}$ RBs) existing in a central portion of the system band. This frequency hopping is called "end hopping."

The radio resource allocating unit 122 of this embodiment determines a mode of transmission of an SRS for each communication terminal 2 communicating with the base station 1. More specifically, the radio resource allocating unit 122 determines an uplink communication period for SRS to be used, the value of the SRS parameter $k_{TC}$, a code pattern of an SRS, a transmission frequency bandwidth for the SRS, a mode of frequency hopping of a transmission frequency band for the SRS, and the like. As s result, a use uplink radio resource for SRS is allocated to each communication terminal 2 communicating with the base station 1.

The transmission signal generating unit 120 generates a transmission signal containing control data to be used to notify the communication terminal 2 of a use uplink radio resource for SRS allocated to this communication terminal 2 by the radio resource allocating unit 122, in other words, control data to be used to notify the communication terminal 2 of a mode of transmission of an SRS to be transmitted from this communication terminal 2 determined by the radio resource allocating unit 122 (in the below, this control data will be called "SRS control data"). This transmission signal is transmitted from the communication unit 13 to this communication terminal 2 using the downlink subframe 302. As a result, the SRS control data is transmitted to each communication terminal 2, so that each communication terminal 2 can know an uplink radio resource to be used for transmitting an SRS. In other words, each communication terminal 2 can know a mode of transmission of an SRS to be transmitted from this communication terminal 2. Each communication terminal 2 transmits an SRS using a use uplink radio resource for SRS notified from the base station 1.

The SRS control data may contain transmission start data to be used to instruct start of transmission of an SRS or transmission stop data to be used to instruct stop of transmission of an SRS. If the communication terminal 2 that is not transmitting an SRS receives the SRS control data containing the transmission start data, this communication terminal 2 starts to transmit an SRS using a use uplink radio resource for SRS contained in this SRS control data. If the communication terminal 2 that is transmitting an SRS receives the SRS control data containing the transmission stop data, this communication terminal 2 stops transmission of the SRS. If a use uplink radio resource to be used by the communication terminal 2 for transmission of an SRS is changed, this communication terminal 2 is notified of the SRS control data containing a new use uplink radio resource for SRS. According to LTE, the SRS control data is called "RRCConnectionReconfiguration message."

<Series of Operations in Communication System for Control of Transmission of SRS>

Figure 10:
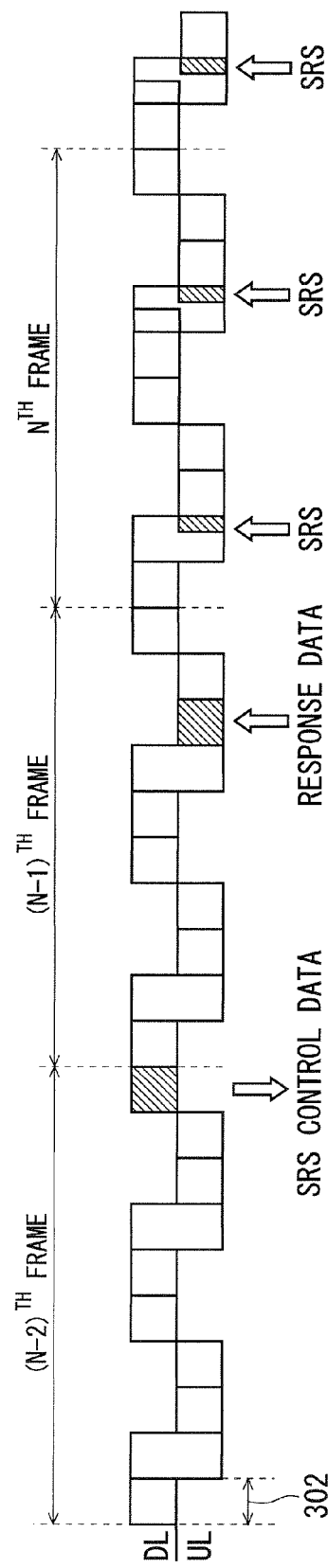
FIG. 10 shows operation of the communication system.

A series of operations in the communication system 100 is described next that lasts from time when one communication terminal 2 receives the SRS control data until time when this communication terminal 2 transmits an SRS using a use uplink radio resource for SRS contained in this SRS control data. FIG. 10 shows this series of operations. In the below, the communication terminal 2 targeted for the description is called a "target communication terminal 2."

As shown in FIG. 10, if the base station 1 transmits a transmission signal containing the SRS control data to the target communication terminal 2 in the downlink subframe 302 existing at the end of the $(N-2)^{th}$ TDD frame 300, for example, the target communication terminal 2 transmits, in the uplink subframe 302 existing in the eighth position from the beginning of the $(N-1)^{th}$ TDD frame 300 (seventh subframe 302) next to the $(N-2)^{th}$ TDD frame 300, a transmission signal containing response data notifying successful receipt of the SRS control data. This response data is called "RRCConnectionReconfigurationComplete message."

The target communication terminal 2 having transmitted the response data transmits an SRS in the subsequent $N^{th}$ TDD frame 300 or in TDD frames 300 after the $N^{th}$ TDD frame 300 using a use uplink radio resource for SRS indicated by the received SRS control data, in other words, based on a mode of transmission contained in this SRS control data.

In the example of FIG. 10, the target communication terminal 2 transmits the response data in the $(N-1)^{th}$ TDD frame 300. Meanwhile, the target communication terminal 2 may transmit the response data in a TDD frame 300 after the $(N-1)^{th}$ TDD frame 300.

The communication terminal 2 that is transmitting an SRS may receive the SRS control data containing a use uplink radio resource for SRS newly allocated to this communication terminal 2. In this case, by the time the communication terminal 2 transmits an SRS using the new use uplink radio resource for SRS contained in this SRS control data (in the example of FIG. 10, by the time of the second special subframe 302 in the $(N-1)^{th}$ TDD frame 300), the target communication terminal 2 transmits the SRS using the use uplink radio resource having been used so far.

As described above, when the base station 1 transmits the SRS control data to the target communication terminal 2 in one TDD frame 300, the target communication terminal 2 transmits an SRS based on this SRS control data in the TDD frame 300 after the next to the former communication terminal 2 at the earliest. Accordingly, if the base station 1 instructs the target communication terminal 2 to start transmission of an SRS or to change a mode of transmission of an SRS, an interval takes some time from transmission of the SRS control data to the target communication terminal 2 until receipt of an SRS having been transmitted from the target communication terminal 2 based on this SRS control data.

The communication system 100 operates in the same way if the base station 1 instructs the target communication terminal 2 that is transmitting an SRS to stop transmission of the SRS. As an example, if the base station 1 transmits the SRS control data containing transmission stop data to the target communication terminal 2 in the downlink subframe 302 existing at the end of the $(N-2)^{th}$ TDD frame 300, for example, the target communication terminal 2 transmits, in the uplink subframe 302 existing in the eighth position from the beginning of the $(N-1)^{th}$ TDD frame 300 (seventh subframe 302) next to the $(N-2)^{th}$ TDD frame 300, response data notifying successful receipt of the SRS control data. The target communication terminal 2 having transmitted the response data stops transmission of the SRS when the time of the next $N^{th}$ TDD frame 300 has come.

As described above, if the base station 1 instructs the target communication terminal 2 to stop transmission of an SRS, an interval takes some time from transmission of the SRS control data to the target communication terminal 2 until stop of transmission of an SRS from the target communication terminal 2.

<Array Transmission Control>

In the array transmission control of this embodiment, a transmission weight is obtained based on one of an SRS and a demodulation reference signal (DMRS) described later as a known signal. The DMRS is also called a "DRS."

In the array transmission control of this embodiment, in order for the communication unit 13 to make downlink communication using a use downlink radio resource allocated to the target communication terminal 2, a transmission weight is obtained based on a known signal (SRS or DMRS) transmitted in the frequency band of this use downlink radio resource from the target communication terminal 2.

In the array transmission control of this embodiment, null steering and beamforming are performed simultaneously. The communication unit 13 updates a reception weight several times according to a sequential update algorithm such as an RLS (recursive least-squares) algorithm, and obtains a transmission weight based on the updated reception weight, thereby performing both null steering and beamforming simultaneously.

In the array transmission control of this embodiment, a transmission weight is obtained for each RB, for example. It is assumed for example that the frequency band of a use downlink radio resource allocated to the target communication terminal 2 is composed of four RBs. Then, for the array transmission control for the target communication terminal 2, a transmission weight is obtained for each of these four RBs. In order to obtain a transmission weight to be applied to a signal to be transmitted to the target communication terminal 2 using one RB in the frequency band of a use downlink radio resource, a reception weight is updated several times based on a plurality of complex symbols forming an SRS transmitted from the target communication terminal 2 in this RB, and then the transmission weight is obtained based on the updated reception weight.

<Association Between Downlink Radio Resource and Uplink Radio Resource for SRS>

In the communication system of this embodiment, a downlink radio resource and an uplink radio resource for SRS are associated for beamforming and null steering based on an SRS. Each base station 1 allocates a use downlink radio resource to the communication terminal 2 to transmit an SRS and performs the array transmission control based on this association, thereby allowing each base station 1 to perform beamforming and null steering properly. In the below, this association will be called "resource association for array control." The resource association for array control is described next.

In the below, regarding two downlink subframes 302 in the unit period 360, the former downlink subframe 302 will be called a "first downlink subframe 302*a*" and the latter downlink subframe 302 will be called a "second downlink subframe 302*b*." Part of the special subframe 302 in the unit period 360 containing the downlink pilot time slot 351 is not the downlink subframe 302. However, this part will be called a "third downlink subframe 302*c*" for the sake of convenience. It is assumed that the subframe 302 described below includes the third downlink subframe 302*c*. Further, the unit period 360 targeted for the description will be called a "target unit period 360."

Figure 11:
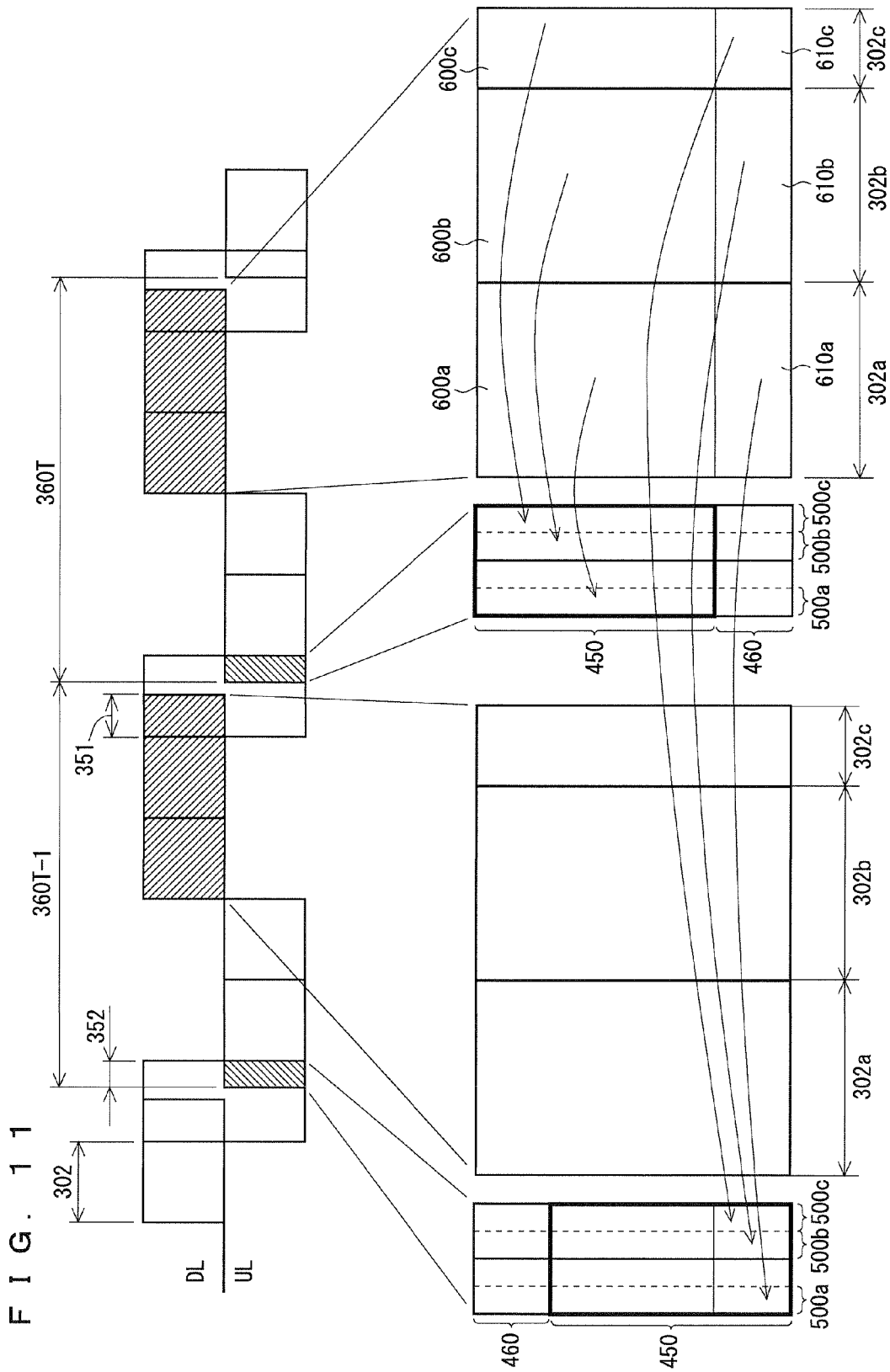
FIG. 11 shows association between a downlink radio resource and an uplink radio resource for SRS.

FIG. 11 explains association between a downlink radio resource and an uplink radio resource for SRS in a unit period 360T. The following description applies to each unit period 360.

In this embodiment, a downlink radio resource having a frequency band contained in the SRS transmission enabling band 450 in the target unit period 360T is associated with an uplink radio resource for SRS in the target unit period 360T. Meanwhile, a downlink radio resource having a frequency band not contained in the SRS transmission enabling band 450, specifically a frequency band contained in the SRS transmission disabling band 460 in the target unit period 360T is associated with an uplink radio resource for SRS in a unit period 360T-1 that comes just before the target unit period 360T.

More specifically, a downlink radio resource which is part of the first downlink subframe 302*a* in the target unit period 360T and which is contained in a downlink radio resource 600*a* including the SRS transmission enabling band 450 in the frequency direction is associated with an uplink radio resource which is part of the first uplink radio resource 500*a* for SRS in the target unit period 360T and which includes the frequency band of the corresponding downlink radio resource in the frequency direction. Specifically, the downlink radio resource contained in the downlink radio resource 600*a* in the target unit period 360T is associated with the uplink radio resource which is part of the first uplink radio resource 500*a* for SRS in the target unit period 360T and which has the same frequency band as that of the corresponding downlink radio resource.

A downlink radio resource which is part of the second downlink subframe 302*b* in the target unit period 360T and which is contained in a downlink radio resource 600*b* including the SRS transmission enabling band 450 in the frequency direction is associated with an uplink radio resource which is part of the second uplink radio resource 500*b* for SRS in the target unit period 360T and which includes the frequency band of the corresponding downlink radio resource in the frequency direction.

A downlink radio resource which is part of the third downlink subframe 302*c* in the target unit period 360T and which is contained in a downlink radio resource 600*c* including the SRS transmission enabling band 450 in the frequency direction is associated with an uplink radio resource which is part of the third uplink radio resource 500*c* for SRS in the target unit period 360T and which includes the frequency band of the corresponding downlink radio resource in the frequency direction.

In contrast, a downlink radio resource which is part of the first downlink subframe 302*a* in the target unit period 360T and which is contained in a downlink radio resource 610*a* including the SRS transmission disabling band 460 in the frequency direction is associated with an uplink radio resource which is part of the first uplink radio resource 500*a* for SRS in the unit period 360T-1 coming just before the target unit period 360T and which includes the frequency band of the corresponding downlink radio resource in the frequency direction.

A downlink radio resource which is part of the second downlink subframe 302b in the target unit period 360T and which is contained in a downlink radio resource 610b including the SRS transmission disabling band 460 in the frequency direction is associated with an uplink radio resource which is part of the second uplink radio resource 500b for SRS in the unit period 360T-1 and which includes the frequency band of the corresponding downlink radio resource in the frequency direction.

A downlink radio resource which is part of the third downlink subframe 302c in the target unit period 360T and which is contained in a downlink radio resource 610c including the SRS transmission disabling band 460 in the frequency direction is associated with an uplink radio resource which is part of the third uplink radio resource 500c for SRS in the unit period 360T-1 and which includes the frequency band of the corresponding downlink radio resource in the frequency direction.

Based on the aforementioned resource association for array control, each base station 1 allocates a use downlink radio resource to the corresponding communication terminal 2 and performs the array transmission control.

More specifically, in each unit period 360, for allocation of a use downlink radio resource from a downlink radio resource in this unit period 360 to the communication terminal 2, the radio resource allocating unit 122 allocates, wherever possible, a use downlink radio resource associated with an uplink radio resource with which this communication terminal 2 transmits an SRS (in the below, this use downlink radio resource will be called an "SRS-associated use downlink radio resource").

If the SRS-associated use downlink radio resource is insufficient for downlink communication with the communication terminal 2 in the unit period 360, the radio resource allocating unit 122 allocates, from a downlink radio resource in this unit period 360, to this communication terminal 2a use downlink radio resource associated with an uplink radio resource with which this communication terminal 2 does not transmit an SRS (in the below, this use downlink radio resource will be called an "SRS-nonassociated use downlink radio resource").

In each base station 1, for downlink communication with the target communication terminal 2 using an SRS-associated use downlink radio resource allocated to this target communication terminal 2 by the radio resource allocating unit 122, the communication unit 13 performs the array transmission control based on an SRS transmitted from the target communication terminal 2 using an uplink radio resource associated with this SRS-associated use downlink radio resource.

In each base station 1, for downlink communication with the target communication terminal 2 using an SRS-nonassociated use downlink radio resource allocated to this target communication terminal 2 by the radio resource allocating unit 122, the communication unit 13 performs the array transmission control based on an SRS or a DMRS transmitted from the target communication terminal 2 in the frequency band of this SRS-nonassociated use downlink radio resource. This will be described in detail later.

In the communication system 100, each base station 1 uses an SRS-associated use downlink radio resource for downlink communication with the communication terminal 2, so that each base station 1 can perform beamforming and null steering properly, as will be described next.

Figure 13:
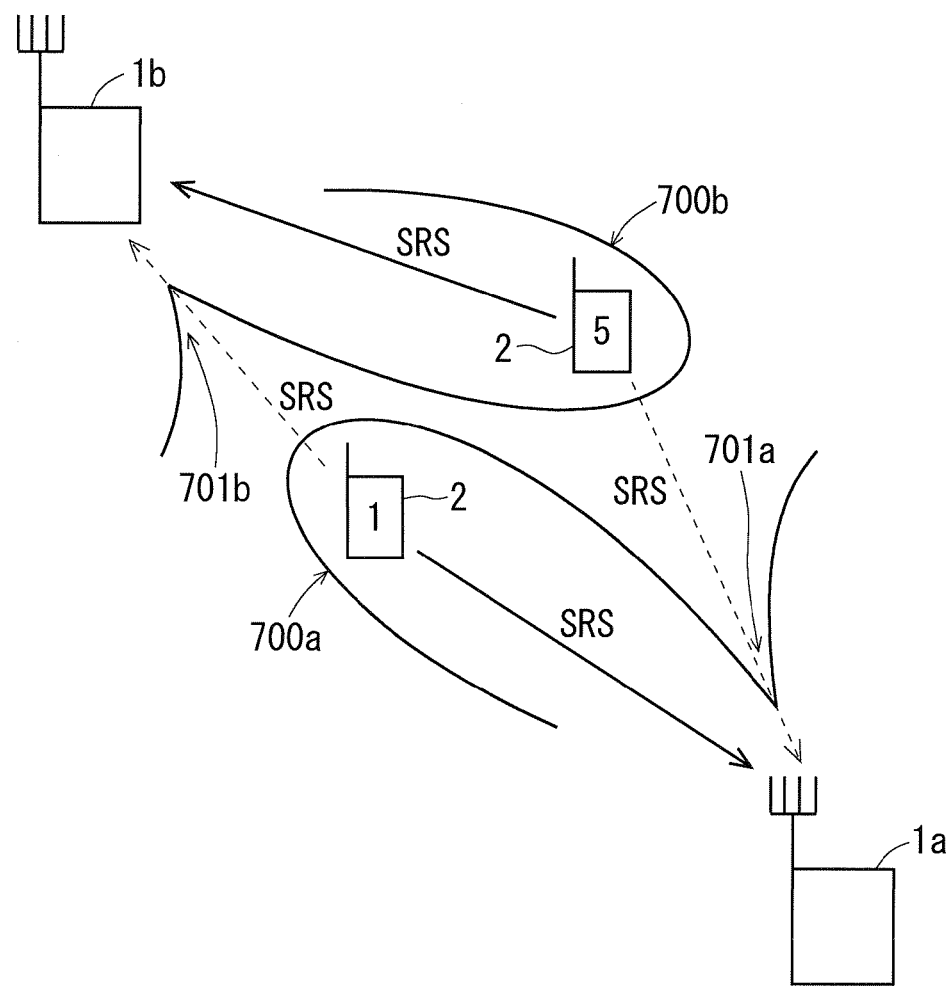
FIG. 13 explains beamforming and null steering performed properly in the base station.

FIGS. 12 and 13 explain how each of a base station 1a and a base station 1b existing in a peripheral area of the base station 1a performs beamforming and null steering properly using an SRS-associated use downlink radio resource. FIG. 12 shows an example of allocation of an SRS-associated use downlink radio resource in the target unit period 360 by each of the base stations 1a and 1b. FIG. 13 shows a beam and a null in the target unit period 360 relating to the transmission directivity of each of the base stations 1a and 1b.

In the examples of FIGS. 12 and 13, the base station la makes downlink communication with the communication terminal 2 with a terminal number 1 in the target unit period 360 using an SRS-associated use downlink radio resource 650a, and the base station 1b makes downlink communication with the communication terminal 2 with a terminal number 5 in the target unit period 360 using an SRS-associated use downlink radio resource 650b same as the SRS-associated use downlink radio resource 650a. Hence, downlink communication between the base station la and the communication terminal 2 with the terminal number 1 might interfere with the communication terminal 2 with the terminal number 5 making downlink communication with the base station 1b existing in a peripheral area of the base station 1a. Likewise, downlink communication between the base station 1b and the communication terminal 2 with the terminal number 5 might interfere with the communication terminal 2 with the terminal number 1 making downlink communication with the base station 1a existing in a peripheral area of the base station 1b.

In the examples of FIGS. 12 and 13, the SRS-associated use downlink radio resource 650a is allocated to the communication terminal 2 with the terminal number 1 from a downlink radio resource in the first downlink subframe 302a including in the frequency direction the SRS transmission enabling band 450 in the target unit period 360. Likewise, the SRS-associated use downlink radio resource 650b is allocated to the communication terminal 2 with the terminal number 5 from a downlink radio resource in the first downlink subframe 302a including in the frequency direction the SRS transmission enabling band 450 in the target unit period 360.

For downlink communication using the SRS-associated use downlink radio resource 650a, the base station 1a performs the array transmission control based on an SRS transmitted from the communication terminal 2 with the terminal number 1 using an uplink radio resource associated with the SRS-associated use downlink radio resource 650a, specifically, using an uplink radio resource 660a which is part of the first uplink radio resource 500a for SRS in the target unit period 360 and which includes the frequency band of the SRS-associated use downlink radio resource 650a in the frequency direction. For downlink communication using the SRS-associated use downlink radio resource 650b, the base station lb performs the array transmission control based on an SRS transmitted from the communication terminal 2 with the terminal number 5 using an uplink radio resource associated with the SRS-associated use downlink radio resource 650b, specifically, using an uplink radio resource 660b which is part of the first uplink radio resource 500a for SRS in the target unit period 360 and which includes the frequency band of the SRS-associated use downlink radio resource 650b in the frequency direction As described above, for downlink communication with the communication terminal 2 with the terminal number 1 using the SRS-associated use downlink radio resource 650a, the base station la performs the array transmission control based on an SRS transmitted from the communication terminal 2 with the terminal number 1 in the same frequency band as that of the SRS-associated use downlink radio resource 650a. This makes a beam 700a relating to the transmission directivity of the base station 1a point toward the communication terminal 2 with the terminal number 1 as a communication counterpart, as shown in FIG. 13. As a result, the base station 1a performs beamforming properly.

Likewise, for downlink communication with the communication terminal 2 with the terminal number 5 using the SRS-associated use downlink radio resource 650b, the base station 1b performs the array transmission control based on an SRS transmitted from the communication terminal 2 with the terminal number 5 in the same frequency band as that of the SRS-associated use downlink radio resource 650b. This makes a beam 700b relating to the transmission directivity of the base station 1b point toward the communication terminal 2 with the terminal number 5 as a communication counterpart. As a result, the base station 1b performs beamforming properly.

If the base station 1a and the base station 1b existing in a peripheral area of the base station 1a make downlink communication using the same SRS-associated use uplink radio resource as in this example, the uplink radio resource 660a used for transmission of an SRS with which the base station 1a performs the array transmission control becomes the same as the uplink radio resource 660b used for transmission of an SRS with which the base station 1b performs the array transmission control. Hence, the SRS the base station 1a receives from the communication terminal 2 with the terminal number 1 in the uplink radio resource 660a contains, as an interference wave component, the SRS transmitted from the communication terminal 2 with the terminal number 5 communicating with the base station 1b. In response, the base station 1a calculates a transmission weight based on the SRS received from the communication terminal 2 with the terminal number 1 in the uplink radio resource 660a, and sets this transmission weight to a transmission signal to be transmitted to the communication terminal 2 with the terminal number 1 using the SRS-associated use downlink radio resource 650a. This makes a null 701a relating to the transmission directivity of the base station 1a point toward the communication terminal 2 with the terminal number 5 which communicates with the base station 1b and which is desired to be prevented from interference, as shown in FIG. 13. As a result, the base station 1a performs null steering properly.

From the viewpoint of the base station 1b, the SRS the base station 1b receives from the communication terminal 2 with the terminal number 5 in the uplink radio resource 660b contains, as an interference wave component, the SRS transmitted from the communication terminal 2 with the terminal number 1 communicating with the base station 1a. In response, the base station 1b calculates a transmission weight based on the SRS received from the communication terminal 2 with the terminal number 5 in the uplink radio resource 660b, and sets this transmission weight to a transmission signal to be transmitted to the communication terminal 2 with the terminal number 5 using the SRS-associated use downlink radio resource 650b. This makes a null 701b relating to the transmission directivity of the base station 1b point toward the communication terminal 2 with the terminal number 1 which communicates with the base station 1a and which is desired to be prevented from interference, as shown in FIG. 13. As a result, the base station 1b performs null steering properly.

As described above, if the base station 1 and the peripheral base station 1 existing in a peripheral area of the former base station 1 make downlink communication using the same SRS-associated use downlink radio resource, each of the base station 1 and the peripheral base station 1 performs beamforming and null steering properly.

In contrast, if the base station 1 uses an SRS-nonassociated use downlink radio resource for downlink communication with the communication terminal 2, the base station 1 cannot perform null steering properly while it could perform beamforming properly.

If the base station 1 uses an SRS-nonassociated use downlink radio resource for downlink communication with the communication terminal 2 and if this communication terminal 2 transmits a known signal (SRS or DMRS) in the same frequency band as that of this SRS-nonassociated use downlink radio resource, the base station 1 performs the array transmission control based on this known signal. In this case, a beam relating to the transmission directivity of the array antenna 110 of the base station 1 points toward this communication terminal 2, so that the base station 1 can perform beamforming properly as in the case where the base station 1 uses an SRS-associated use downlink radio resource.

Meanwhile, the following case is considered where the base station 1 and the peripheral base station 1 existing in a peripheral area of the former base station 1 make downlink communication using the same use downlink radio resource, where the base station 1 uses an SRS-nonassociated use downlink radio resource, where the communication terminal 2 as a communication counterpart of the base station 1 transmits a known signal (SRS or DMRS) in the same frequency band as that of this SRS-nonassociated use downlink radio resource, and where the peripheral base station 1 uses an SRS-associated use downlink radio resource. In this case, as understood from the foregoing explanation, the known signal used by the base station 1 for the array transmission control and an SRS used by the peripheral base station 1 for the array transmission control are transmitted using different uplink radio resources. Hence, the known signal used by the base station 1 for the array transmission control does not contain, as an interference wave component, the SRS from the communication terminal 2 communicating with the peripheral base station 1. Further, the SRS used by the peripheral base station 1 for the array transmission control does not contain, as an interference wave component, the known signal from the communication terminal 2 communicating with the base station 1. This makes it impossible for the base station 1 to make a null relating to the transmission directivity of the array antenna 110 thereof point toward the communication terminal 2 communicating with the peripheral base station 1, while making it impossible for the peripheral base station 1 to make a null relating to the transmission directivity of the array antenna 110 thereof point toward the communication terminal 2 communicating with the base station 1. As a result, both the base station 1 and the peripheral base station 1 become unable to perform null steering properly.

As described above, if the base station 1 uses an SRS-nonassociated use downlink radio resource for downlink communication with the communication terminal 2, the base station 1 cannot perform null steering properly. Thus, as described above, each base station 1 tries to allocate an SRS-associated use downlink radio resource wherever possible.

<DMRS>

In the communication system 100, part of the uplink subframe 302 for data transmission is used for transmission of a known signal called a DMRS. Each base station 1 can use not only the SRS but also a DMRS for the array transmission control. A DMRS is composed of a plurality of complex symbols to modulate a plurality of subcarriers, and is transmitted in the fourth symbol period 304 from the beginning of each slot 303 of the uplink subframe 302.

Figure 14:
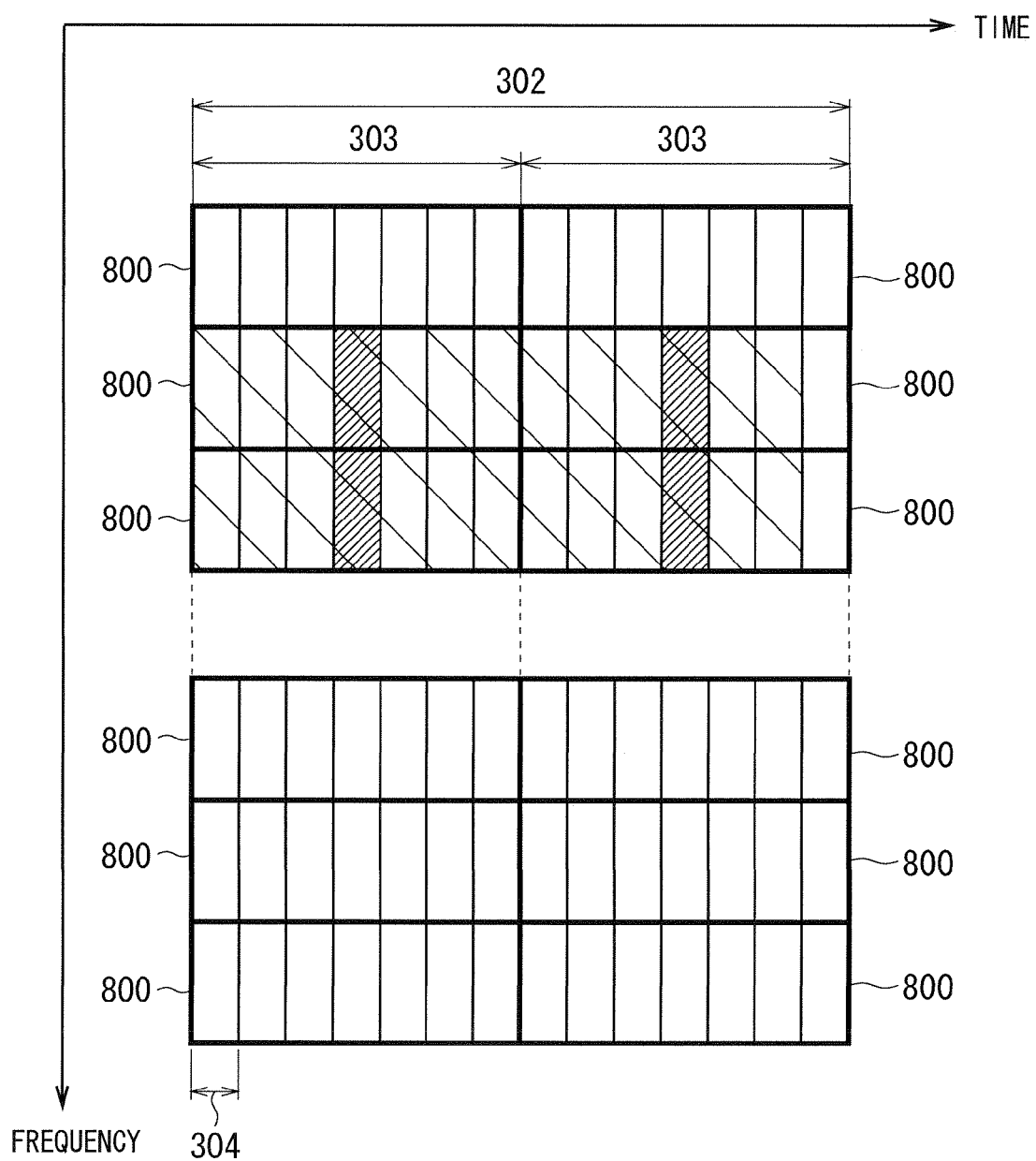
FIG. 14 shows how a DMRS is transmitted in an uplink subframe.

The target communication terminal 2 transmits a DMRS using part of a resource block allocated as a use uplink radio resource from the uplink subframe 302 by the radio resource allocating unit 122 of the base station 1. FIG. 14 shows a mode of this transmission. FIG. 14 shows one uplink subframe 302. Diagonal lines running from top left to bottom right are given to resource blocks 800 (excluding the last symbol period 304 in the uplink subframe 302 when an SRS can be transmitted) allocated as a use uplink radio resource to the target communication terminal 2. In the example of FIG. 14, four resource blocks 800 are allocated as a use uplink radio resource to the target communication terminal 2. The target communication terminal 2 transmits a DMRS in each resource block 800 allocated as a use uplink radio resource to the target communication terminal 2 itself using a plurality of subcarriers in the fourth symbol period 304 from the beginning. In FIG. 14, both diagonal lines running from top left to bottom right and diagonal lines running from top right to bottom left are given to a part including the fourth symbol period 304 from the beginning of each resource block 800 allocated to the target communication terminal 2.

In this embodiment, regarding the two slots 303 of the uplink subframe 302, a DMRS transmitted in the former slot 302 is used for the array transmission control, and a DMRS transmitted in the latter slot 302 is not used for the array transmission control.

<Use of SRS and DMRS For Respective Purposes>

In each base station 1, the communication unit 13 determines which of an SRS and DMRS is to be used for the array transmission control for downlink communication with the target communication terminal 2. A method of determining a known signal to be used for the array transmission control is described next.

As described above, if an SRS-associated use downlink radio resource is used for downlink communication with the communication terminal 2, the base station 1 can perform beamforming and null steering properly. Specifically, for downlink communication using an SRS-associated use downlink radio resource allocated to the target communication terminal 2 by the radio resource allocating unit 122, if the communication unit 13 performs the array transmission control based on an SRS transmitted from the target communication terminal 2 in an uplink radio resource associated with this SRS use downlink radio resource, beamforming and null steering can be performed properly. Accordingly, in this embodiment, if an SRS-associated use downlink radio resource is to be used for downlink communication with the communication terminal 2, the communication unit 13 determines that an SRS is to be used for the array transmission control for this downlink communication. Specifically, for downlink communication using a use downlink radio resource allocated to the target communication terminal 2 by the radio resource allocating unit 122, if the target communication terminal 2 transmits an SRS using an uplink radio resource associated with this use downlink radio resource, the communication unit 13 determines that this SRS is to be used for the array transmission control.

Meanwhile, if an SRS-nonassociated use downlink radio resource is to be used for downlink communication with the communication terminal 2 and if the array transmission control is performed for this downlink communication, the base station 1 cannot perform null steering properly while it could perform beamforming properly. Additionally, regarding downlink communication between the base station 1 and the target communication terminal 2, increase of time between the timing of receipt of a known signal to be used for the array transmission control and the timing of the downlink communication after the array transmission control is performed based on this known signal may cause the target communication terminal 2 to move largely in this time if the target communication terminal 2 moves at high speed. This may make it impossible for a beam relating to the transmission directivity of the array antenna 110 of the base station 1 to point toward the target communication terminal 2 properly. Thus, for beamforming for downlink communication between the base station 1 and the communication terminal 2, it is desirable that the array transmission control be performed based on a known signal transmitted from this communication terminal 2 in compliance with timing as close as possible to the timing of this downlink communication.

In this embodiment, for downlink communication with the communication terminal 2 using an SRS-nonassociated use downlink radio resource after the array transmission control, the communication unit 13 uses a known signal (SRS or DMRS) for the array transmission control that is received in compliance with timing as close as possible to the timing of this downlink communication. Specifically, if the communication unit 13 is to perform the array transmission control using a use downlink radio resource allocated to the target communication terminal 2 by the radio resource allocating unit 122 and then make downlink communication, and if the target communication terminal 2 does not transmit an SRS using an uplink radio resource associated with this use downlink radio resource, the communication unit 13 performs the array transmission control based on a known signal received in compliance with timing as close as possible to the timing of this downlink communication.

Figure 15:
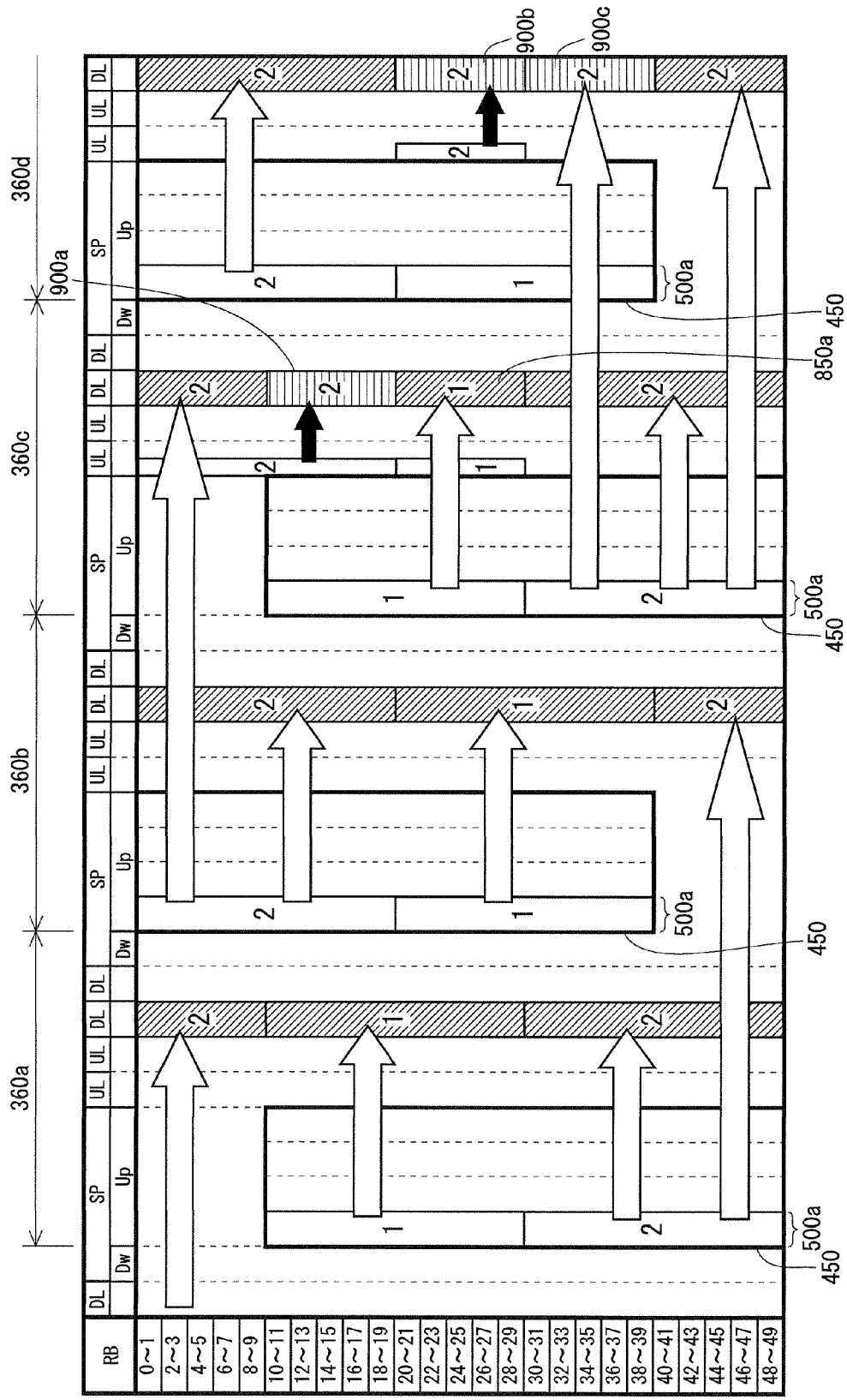
FIG. 15 shows an example of allocation of a use uplink radio resource for SRS and a use downlink radio resource to a communication terminal by the base station.

FIG. 15 shows an example of allocation of a use downlink radio resource in the base station 1. FIG. 15 shows each subframe 302 in four consecutive unit periods 360a to 360d. In the example of FIG. 15, the base station 1 communicates with the communication terminal 2 with a terminal number 1 and the communication terminal 2 with a terminal number 2. A use uplink radio resource for SRS corresponding to 20 RBs is allocated from the first uplink radio resource 500a to each of the communication terminals 2 with the terminal numbers 1 and 2. The frequency band of the use uplink radio resource for SRS allocated to the communication terminal 2 with the terminal number 1 is subjected to middle hopping, whereas the frequency band of the use uplink radio resource for SRS allocated to the communication terminal 2 with the terminal number 2 is subjected to end hopping.

In the example of FIG. 15, only the SRS-associated use downlink radio resource is allocated to the communication terminal 2 with the terminal number 1, whereas both an SRS-associated use downlink radio resource and an SRS-nonassociated use downlink radio resource are allocated to the communication terminal 2 with the terminal number 2. In FIG. 15, SRS-associated use downlink radio resources are given diagonal lines, and SRS-nonassociated use downlink radio resource are given horizontal lines.

In the example of FIG. 15, in the first uplink subframe 302 in the unit period 360c, the communication terminal 2 with the terminal number 1 transmits a DMRS in the $20^{th}$ to $29^{th}$ RBs, and the communication terminal 2 with the terminal number 2 transmits a DMRS in the $0^{th}$ to $19^{th}$ RBs. Further, in the first uplink subframe 302 in the unit period 360d, the communication terminal 2 with the terminal number 2 transmits a DMRS in the $20^{th}$ to $29^{th}$ RBs.

Arrows of FIG. 15 each show a relation between a use downlink radio resource and a known signal (SRS or DMRS) used for the array transmission control for downlink communication to be made using this use downlink radio resource. An end point of an arrow shows a use downlink radio resource, and a starting point of the arrow shows a known signal used for the array transmission control for downlink communication to be made using this use downlink radio resource.

As shown in FIG. 15, only the SRS-associated use downlink radio resource is allocated to the communication terminal 2 with the terminal number 1 in each of the unit periods 360a to 360d. Accordingly, an SRS is always used for the array transmission control for downlink communication between the base station 1 and the communication terminal 2 with the terminal number 1.

In the example of FIG. 15, the communication terminal 2 with the terminal number 1 transmits a DMRS using $20^{th}$ to $29^{th}$ RBs in an interval between a time period when the base station 1 makes downlink communication with the communication terminal 2 with the terminal number 1 in the unit period 360c using an SRS-associated use downlink radio resource 850a including $20^{th}$ to $29^{th}$ RBs in the frequency direction and a time period when the communication terminal 2 with the terminal number 1 transmits an SRS using an uplink radio resource associated with the SRS-associated use downlink radio resource 850a (time period when the communication terminal 2 with the terminal number 1 transmits the SRS using the $20^{th}$ to $29^{th}$ RBs in the unit period 360c). Thus, in order for the base station 1 to make downlink communication with the communication terminal 2 with the terminal number 1 in the unit period 360c using the SRS-associated use downlink radio resource 850a, it is desirable that the array transmission control be performed based on the aforementioned DMRS if consideration is given only to the performance of beamforming. However, null steering cannot be performed properly if the array transmission control is performed based on this DMRS. In this embodiment, the performance of null steering is given higher priority. For this, not this DMRS but the SRS transmitted from the communication terminal 2 with the terminal number 1 using the uplink radio resource associated with the SRS-associated use downlink radio resource 850a is used as a basis for the array transmission control. This also applies to downlink communication between the base station 1 and the communication terminal 2 with the terminal number 2 using an SRS-associated use downlink radio resource.

An SRS-nonassociated use downlink radio resource is allocated to the communication terminal 2 with the terminal number 2 in each of the unit periods 360c and 360d. More specifically, in the unit period 360c, an SRS-nonassociated use downlink radio resource 900a is allocated to the communication terminal 2 with the terminal number 2. The SRS-nonassociated use downlink radio resource 900a includes $10^{th}$ to $19^{th}$ RBs in the frequency direction with which the communication terminal 2 with the terminal number 2 transmits an SRS in the unit period 360b. In the unit period 360d, an SRS-nonassociated use downlink radio resource 900b and an SRS-nonassociated use downlink radio resource 900c are allocated to the communication terminal 2 with the terminal number 2. The SRS-nonassociated use downlink radio resource 900b includes a frequency band in the frequency direction where the communication terminal 2 with the terminal number 2 does not transmit an SRS at all, specifically, includes the $20^{th}$ to $29^{th}$ RBs in the frequency direction. The SRS-nonassociated use downlink radio resource 900c includes $30^{th}$ to $39^{th}$ RBs in the frequency direction with which the communication terminal 2 with the terminal number 2 transmits an SRS in the unit period 360c.

As shown in FIG. 15, in an interval between a time period when the base station 1 makes downlink communication with the communication terminal 2 with the terminal number 2 using the SRS-nonassociated use downlink radio resource 900a and a time period when the communication terminal 2 with the terminal number 2 transmits an SRS in the unit period 360b in the frequency band of the SRS-nonassociated use downlink radio resource 900a, the communication terminal 2 with the terminal number 2 transmits a DMRS in this frequency band. Thus, for downlink communication with the communication terminal 2 with the terminal number 2 using the SRS-nonassociated use downlink radio resource 900a, the base station 1 performs the array transmission control based on this DMRS. This allows the base station 1 to perform the array transmission control based on a known signal received in compliance with timing close to the timing of the downlink communication.

Figure 16:
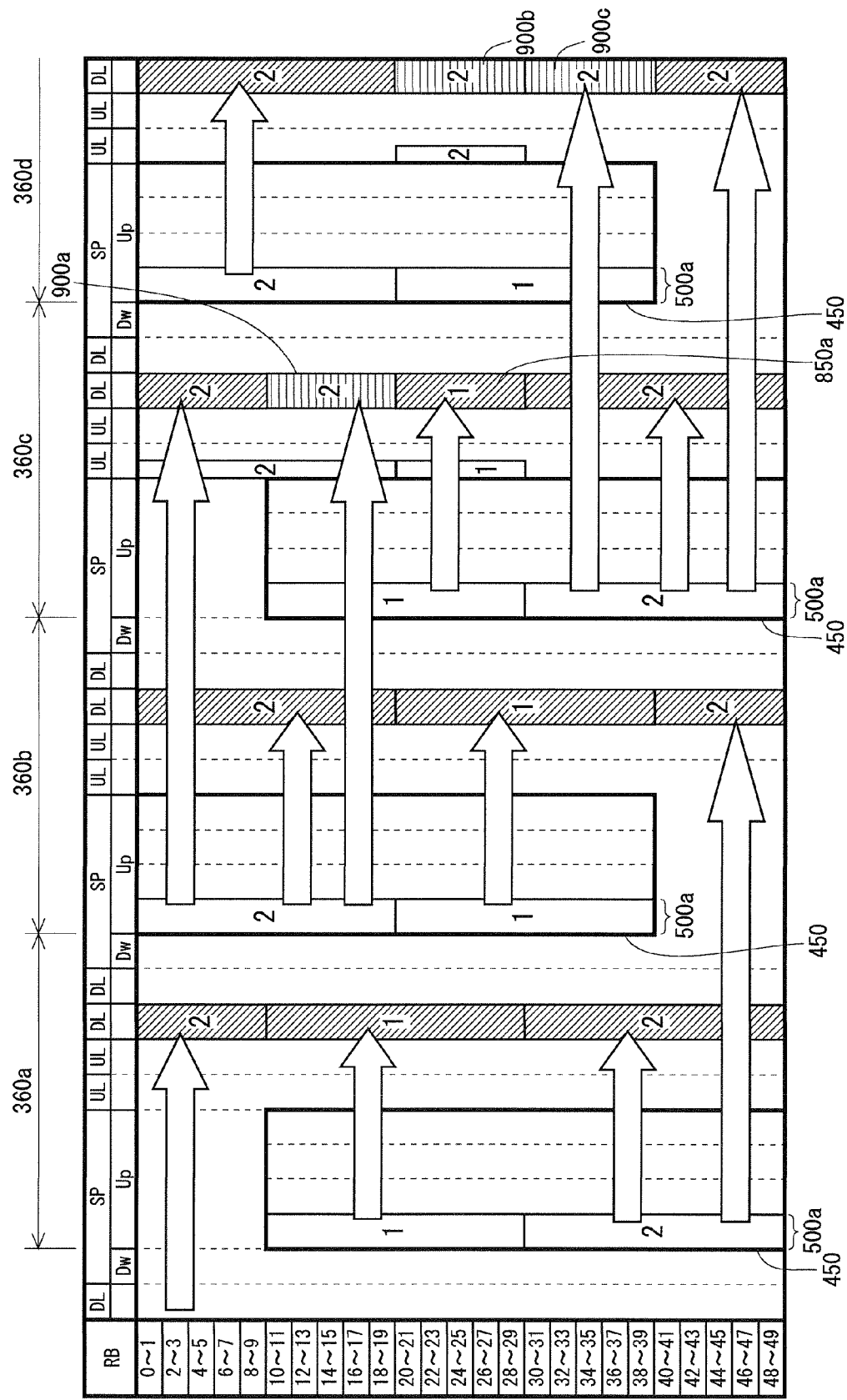
FIG. 16 explain effect achieved by the base station.

In contrast, unlike this embodiment, only the SRS might be used for the array transmission control without using a DMRS at all. In this case, for downlink communication with the communication terminal 2 with the terminal number 2 using the SRS-nonassociated use downlink radio resource 900a, the array transmission control is performed based on an SRS transmitted in the unit period 360b from the communication terminal 2 with the terminal number 2. In this case, the base station 1 performs the array transmission control based on a known signal received in compliance with timing far from the timing of the downlink communication. FIG. 16 shows the array transmission control performed using only the SRS while a use downlink radio resource is allocated to each of the communication terminals 2 with the terminal numbers 1 and 2, as in the example of FIG. 15. Arrows of FIG. 16 have the same meaning as those of FIG. 15.

In this embodiment, the base station 1 can perform the array transmission control based on a known signal received in compliance with timing close to the timing of downlink communication. This allows a beam to point toward the communication terminal 2 properly even if this communication terminal 2 moves at high speed.

Further, while the communication terminal 2 with the terminal number 2 does not transmit an SRS in the frequency band of the SRS-nonassociated use downlink radio resource 900b in the unit period 360d, it transmits a DMRS in the unit period 360d. Thus, for downlink communication with the communication terminal 2 with the terminal number 2 using the SRS-nonassociated use downlink radio resource 900b, the base station 1 performs the array transmission control based on this DMRS.

The communication terminal 2 with the terminal number 2 does not transmit an SRS in the frequency band of the SRS-nonassociated use downlink radio resource 900b. Hence, in contrast to the above, if only the SRS is used for the array transmission control as in FIG. 16, the array transmission control cannot be performed for downlink communication to be made using the SRS-nonassociated use downlink radio resource 900b. Specifically, for downlink communication using the SRS-nonassociated use downlink radio resource 900b, the base station 1 employs omni transmission. In this case, the communication terminal 2 with the terminal number 2 finds difficulty in receiving a transmission signal from the base station 1.

In this embodiment, for downlink communication using the SRS-nonassociated use downlink radio resource 900b, the base station 1 performs the array transmission control based on a DMRS. This allows a beam to point toward the communication terminal 2 with the terminal number 2 properly. As a result, the communication terminal 2 with the terminal number 2 can reliably receive a transmission signal from the base station 1.

In an interval between a time period when the base station 1 makes downlink communication with the communication terminal 2 with the terminal number 2 using the SRS-nonassociated use downlink radio resource 900c in the unit period 360d and a time period when the communication terminal 2 with the terminal number 2 transmits an SRS in the unit period 360c in the frequency band of the SRS-nonassociated use downlink radio resource 900c, the communication terminal 2 with the terminal number 2 does not transmit a DMRS in this frequency band. Thus, for downlink communication with the communication terminal 2 with the terminal number 2 using the SRS-nonassociated use downlink radio resource 900c, the base station 1 performs the array transmission control based on an SRS transmitted in the unit period 360c in the frequency band of the SRS-nonassociated use downlink radio resource 900c from the communication terminal 2 with the terminal number 2.

As described above, in this embodiment, for downlink communication with the communication terminal 2 using a use downlink radio resource allocated to this communication terminal 2, if this communication terminal 2 transmits an SRS using an uplink radio resource associated with this use downlink radio resource, the communication unit 13 performs the array transmission control based on this SRS. This allows beamforming and null steering to be performed properly.

Further, in this embodiment, for downlink communication with the communication terminal 2, the communication unit 13 performs the array transmission control based on a known signal transmitted from this communication terminal 2 in compliance with timing as close as possible to the timing of this downlink communication. This allows a beam to point toward the communication terminal 2 properly even if this communication terminal 2 moves at high speed. Thus, beamforming can be performed properly.

In the aforementioned example, both beamforming and null steering are performed even in the case where the array transmission control is performed based on a DMRS. However, only the beamforming may be performed in this case. Even if the base station 1 performs null steering for the array transmission control based on a DMRS, a null is less likely to point toward the communication terminal 2 which communicates with the peripheral base station 1 existing in a peripheral area of the former base station 1 and which is desired to be prevented from interference. Thus, performing the only the beamforming will not cause a problem. Performing both beamforming and null steering tends to reduce the gain of a resultant beam due to influence of a resultant null. Thus, performing only the beamforming can increase the gain of a resultant beam and allows the communication terminal 2 to receive a transmission signal from the base station 1 reliably.

In the aforementioned example, a use uplink radio resource and a use downlink radio resource are allocated to the communication terminal 2 while these radio resources are not particularly associated. Meanwhile, regarding allocation of an SRS-nonassociated use downlink radio resource from a downlink radio resource in the unit period 360 to the communication terminal 2, the radio resource allocating unit 122 may allocate to this communication terminal 2 a use uplink radio resource such that this communication terminal 2 transmits a DMRS in the frequency band of this SRS-nonassociated use downlink radio resource in this unit period 360. Thus, for downlink communication with the communication terminal 2 using an SRS-nonassociated use downlink radio resource allocated from a downlink resource in the unit period 360 to this communication terminal 2, the communication unit 13 can receive a DMRS without fail transmitted from this communication terminal 2 in the frequency band of this SRS-nonassociated use downlink radio resource. As a result, for downlink communication using an SRS-nonassociated use downlink radio resource, the base station 1 can always perform the array transmission control based on a DMRS received in compliance with timing close to the timing of this downlink communication, thereby performing beamforming properly. This allows the array transmission control to be performed based on a DMRS transmitted in the unit period 360d, whereas in the example of FIG. 15, for downlink communication using the SRS-nonassociated use downlink radio resource 900c in the unit period 360d, the array transmission control is performed based on an SRS transmitted in the unit period 360c coming just before the unit period 360d.

The present invention is applied to LTE in the aforementioned example. Meanwhile, the present invention is also applicable to a different communication system.

While the invention has been shown and described in detail, the foregoing description is in all aspects illustrative and not restrictive. It is therefore understood that numerous modifications not shown can be devised without departing from the scope of the invention.

REFERENCE SIGNS LIST

1: Base station
2: Communication terminal
13: Communication unit
110a: Antenna
122: Radio resource allocating unit

The invention claimed is:
1. A base station among a plurality of base stations in a communication system, the base station comprising:
   a communication unit that makes communication using a plurality of antennas, and for downlink communication, controls the transmission directivity of the antennas based on a known signal transmitted from a communication terminal, and
   a radio resource allocating unit that allocates a downlink radio resource to a communication terminal to be used for downlink communication between said communication unit and this communication terminal, wherein
   said known signal includes a first known signal and a second known signal transmitted from a communication terminal using different uplink radio resources,
   in said communication system, a downlink radio resource and an uplink radio resource to be used for transmission of said first known signal from a communication terminal are associated for beamforming and null steering to be performed based on said first known signal,
   for downlink communication with a communication terminal using a downlink radio resource allocated to this communication terminal by said radio resource allocating unit, if this communication terminal does not transmit said first known signal using an associated uplink radio resource associated with this downlink radio resource but it transmits said first known signal using a non-associated uplink radio resource which is not associated with this downlink radio resource and which includes a frequency band of this downlink radio resource in a frequency direction,
   said communication unit controls the transmission directivity of said antennas based on said second known signal if the aforementioned communication terminal transmits said second known signal in the frequency band of the aforementioned downlink radio resource in an interval between a time period of this downlink radio resource and a time period of the aforementioned non-associated uplink radio resource.

2. The base station according to claim 1, wherein
for downlink communication with a communication terminal using a downlink radio resource allocated to this communication terminal by said radio resource allocating unit, if this communication terminal transmits said first known signal using an associated uplink radio resource associated with this downlink radio resource,
said communication unit controls the transmission directivity of said antennas based on said first known signal, even if the aforementioned communication terminal transmits said second known signal in the frequency band of the aforementioned downlink radio resource in an interval between a time period of this downlink radio resource and a time period when this communication terminal transmits said first known signal using said nonassociated uplink radio resource.

3. The base station according to claim 1, wherein for downlink communication with a communication terminal using a downlink radio resource which is allocated to this communication terminal by said radio resource allocating unit and which includes in a frequency direction a frequency band where this communication terminal does not transmit said first known signal, if this communication terminal transmits said second known signal in the frequency band of this downlink radio resource, said communication unit controls the transmission directivity of said antennas based on said second known signal.

4. The base station according to claim 1, wherein of beamforming and null steering, said communication unit performs only the beamforming if said communication unit controls the transmission directivity of said antennas based on said second known signal.

5. A communication method adopted for communication of a base station among a plurality of base stations m a communication system with a communication terminal, comprising:

(a) a step of making communication using a plurality of antennas, and for downlink communication, controlling a transmission directivity of the antennas based on a known signal transmitted from a communication terminal, and (b) a step of allocating a downlink radio resource to a communication terminal to be used for the downlink communication with this communication terminal in said step (a), wherein said known signal includes a first known signal and a second known signal transmitted from a communication terminal using different uplink radio resources, in said communication system, a downlink radio resource and an uplink radio resource to be used for transmission of said first known signal from a communication terminal are associated for beamforming and null steering to be performed based on said first known signal, and for downlink communication with a communication terminal using a downlink radio resource allocated to this communication terminal in said step (b), if this communication terminal does not transmit said first known signal using an associated uplink radio resource associated with this downlink radio resource but it transmits said first known signal using a non-associated uplink radio resource which is not associated with this downlink radio resource and which includes a frequency band of this downlink radio resource in a frequency direction, the transmission directivity of said antennas is controlled based on said second known signal in step (a) if the aforementioned communication terminal transmits said second known signal in the frequency band of the aforementioned downlink radio resource in an interval between a time period of this downlink radio resource and a time period of the aforementioned non-associated uplink radio resource.

* * * * *